US 6,598,946 B2

(12) United States Patent
Nagae

(10) Patent No.: US 6,598,946 B2
(45) Date of Patent: Jul. 29, 2003

(54) VEHICULAR BRAKE CONTROL APPARATUS AND VEHICULAR BRAKE CONTROL METHOD

(75) Inventor: Akira Nagae, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 36 days.

(21) Appl. No.: 09/907,757

(22) Filed: Jul. 19, 2001

(65) Prior Publication Data

US 2002/0014799 A1 Feb. 7, 2002

(30) Foreign Application Priority Data

Jul. 31, 2000 (JP) ........................................ 2000-231989

(51) Int. Cl.[7] ................. B60T 8/24; B60T 8/58
(52) U.S. Cl. .................. 303/190; 180/249; 701/89
(58) Field of Search ............................ 180/244, 249; 303/190, 3, 15, 20; 701/81, 89

(56) References Cited

U.S. PATENT DOCUMENTS

| | | |
|---|---|---|
| 4,753,131 A | 6/1988 | Wupper |
| 4,761,043 A | 8/1988 | Wupper et al. |
| 4,762,376 A | 8/1988 | Matsubara |
| 4,792,193 A | 12/1988 | Takahashi et al. |
| 4,962,970 A | 10/1990 | Jonner et al. |
| 4,991,679 A * | 2/1991 | Fujii et al. .................. 180/233 |
| 5,093,790 A | 3/1992 | Shiraishi et al. |
| 5,105,903 A | 4/1992 | Buschmann |
| 5,125,490 A | 6/1992 | Suzumura et al. |
| 5,249,849 A | 10/1993 | Sakata |
| 5,282,138 A | 1/1994 | Sano |
| 5,470,135 A | 11/1995 | Shitani et al. |
| 5,688,202 A | 11/1997 | Bowen |
| 5,702,165 A | 12/1997 | Koibuchi |
| 5,897,601 A | 4/1999 | Suzuki |
| 5,941,613 A | 8/1999 | Tagawa |
| 6,007,454 A | 12/1999 | Takahira et al. |
| 6,035,251 A | 3/2000 | Hac et al. |
| 6,122,584 A | 9/2000 | Lin et al. |
| 6,189,643 B1 | 2/2001 | Takahashi et al. |
| 6,195,606 B1 | 2/2001 | Barta et al. |
| 6,208,929 B1 | 3/2001 | Matsuno et al. |
| 6,273,529 B1 | 8/2001 | Woywod et al. |
| 6,278,930 B1 | 8/2001 | Yamada et al. |
| 6,305,760 B1 | 10/2001 | Otake |
| 6,308,126 B2 | 10/2001 | Yokoyama et al. |

FOREIGN PATENT DOCUMENTS

| | | |
|---|---|---|
| AU | 52942/98 | 8/1998 |
| DE | 198 04 716 A1 | 8/1998 |
| EP | 0 260 451 A2 | 3/1988 |
| EP | 0 463 777 A2 | 1/1992 |
| JP | 08-310366 | 11/1996 |
| JP | 09-20217 | 1/1997 |
| JP | 09-249109 | 9/1997 |
| JP | 10-81217 | 3/1998 |

OTHER PUBLICATIONS

"All Wheel Drive Traction Control System", Kenneth Mason Publications, Hampshire, GB, No. 324, Apr. 1, 1991, p. 223.

* cited by examiner

Primary Examiner—Christopher P. Schwartz

(57) ABSTRACT

A vehicle is equipped with a coupling such as, for example, a center differential or a variable clutch, that transmits a driving force from an engine to a front-wheel drive shaft and a rear-wheel drive shaft while allowing a difference in rotational speed therebetween and a brake controller that individually controls braking forces to be applied to wheels in accordance with a running state of the vehicle. A vehicular brake controller prohibits braking force control from being started if the coupling is in its locked state or when the coupling causes a relatively great connecting strength to exist between the front-wheel and rear-wheel drive shafts. While braking force control is being performed by the brake controller, braking force control is continued even if there is a command to cause the coupling to be locked or to achieve the great coupling strength.

16 Claims, 23 Drawing Sheets

VEHICULAR BRAKE CONTROL APPARATUS AND VEHICULAR BRAKE CONTROL METHOD

INCORPORATION BY REFERENCE

The disclosure of Japanese Patent Application No. 2000-231989 filed on Jul. 31, 2000, including the specification, drawings and abstract is incorporated herein by reference in its entirety.

BACKGROUND OF THE INVENTION

1. Field of Invention

The invention relates to a vehicular brake control apparatus and a vehicular brake control method for individually controlling brakes that are provided in wheels respectively and stabilizing a running state of the vehicle.

2. Description of Related Art

There has been conventionally known a vehicle behavior control apparatus that individually controls brakes that are provided in wheels respectively to stabilize a running state of the vehicle. For example, Japanese Patent Application Laid-Open No. 8-310366 discloses a technique in which, in the circumstance where the vehicle behavior is about to shift to a spin tendency or a drift-out tendency, braking forces for wheels are adjusted in accordance with an actual state of the vehicle behavior in such a manner as to curb the shift. For example, in a vehicle equipped with a center differential that transmits a driving force from an engine to front-wheel and rear-wheel drive shafts while allowing a difference in rotational speed therebetween, if a differential mechanism of the center differential has been locked through operation by a driver, front-wheel-side and rear-wheel-side rotational speeds are locked with respect to each other. Namely, the sum of wheel speeds of the front-left and front-right wheels and the sum of wheel speeds of the rear-left and rear-right wheels always coincide with each other. Thus, if a braking force has been applied to the turning-wise outside front wheel to reduce a speed thereof to a certain extent, one of the following influences, i.e., (a) an increase in speed of the turning-wise inside front wheel, (b) a decrease in speed of the turning-wise inside rear wheel, and (c) a decrease in speed of the turning-wise inside and outside rear wheels emerges to an extent corresponding to a decrease in rotational speed of the turning-wise outside front wheel. In a front-wheel-drive vehicle or a four-wheel-drive vehicle based on a front-wheel-drive mode, the process of estimating a vehicle speed is performed based on a speed of the turning-wise inside front wheel. Therefore, the estimated vehicle speed is high in the case of (a). This causes a rise in target speed of the turning-wise outside front wheel and thus a decrease in braking force applied to the turning-wise outside front wheel. Further, if the speed of the turning-wise inside rear wheel has decreased and the brake has been applied as in the case of (b), a moment promoting a spin tendency acts on the vehicle body. Moreover, if a braking force has also been applied to the turning-wise outside rear wheel as in the case of (c), the tire side force on the rear-wheel side decreases. This affects controllability of the vehicle behavior.

Thus, if turning behavior control of the vehicle is started in the circumstance where the center differential has been locked, driveability of the vehicle may be affected.

Further, if it has been required to lock the center differential through operation by a driver or the like in the circumstance where such brake control of the vehicle has once been started, it is for instance contemplable to lock the center differential according to the requirement and suspend brake control correspondingly. However, if brake control has been suspended before its completion, the spin/drift-out curbing effect to be exerted by brake control may be degraded.

SUMMARY OF THE INVENTION

The invention has been made to address the above-described problems. It is one object of the invention to provide a vehicular brake control apparatus and a vehicular brake control method capable of desirable vehicular brake control taking into account a connecting state between front-wheel and rear-wheel drive shafts, a timing for changing the connecting state, and a timing for performing brake control.

A vehicular brake control apparatus according to a first aspect of the invention comprises (a) a connecting state coupling interposed between a front-wheel drive shaft that transmits a driving force to a front-wheel side and a rear-wheel drive shaft that transmits the driving force to a rear-wheel side, and that changes a connecting state between the front-wheel drive shaft and the rear-wheel drive shaft, (b) brakes, each of which is provided in a corresponding one of wheels to apply a braking force to the corresponding one of the wheels, and (c) a brake controller that performs operation control of the brakes in accordance with a running state of the vehicle and that controls braking forces to be applied to the wheels individually. The brake controller prohibits brake control even if conditions for starting brake control by the brake controller have been fulfilled during a period in which the coupling causes a great connecting strength to act between the front-wheel drive shaft and the rear-wheel drive shaft. The brake controller continues brake control even if the connecting state between the front-wheel drive shaft and the rear-wheel drive shaft has been changed during performance of the brake control such that the great connecting strength acts therebetween.

According to the first aspect, while a great connecting strength acts between the front-wheel and rear-wheel drive shafts (hereinafter referred to as "between both the drive shafts" in this section), front-wheel-side and rear-wheel-side rotational speeds are more likely to be locked with respect to each other, in comparison with the case where a small connecting strength acts therebetween. Thus, if brake control has been performed for a specific one of the wheels, rotating states of the other wheels are affected. Therefore, in some cases, the effect to be exerted by the brake controller is not achieved sufficiently. To overcome this problem, brake control is prohibited even if the conditions for starting brake control by the brake controller have been fulfilled during a period while a great connecting strength acts between both the drive shafts.

Further, assuming that the connecting strength between both the drive shafts has become great while brake control is being performed by the brake controller, if brake control is suspended immediately on the ground that the connecting strength has become great, brake control is suspended immediately in the circumstance where the running state of the vehicle is about to be stabilized. Thus, in some cases, the effect of brake control is not achieved sufficiently. To overcome this problem, brake control is continued by the brake controller even if the connecting strength between both the drive shafts has become great while brake control is being performed by the brake controller.

In the above-mentioned first aspect, it may be determined whether or not both the drive shafts have been locked with respect to each other by the coupling, so as to determine whether or not the connecting strength between both the drive shafts has become great.

Further, in the case where the connecting strength between both the drive shafts becomes great temporarily, e.g., for a short period that can be determined in advance, if brake control that is being performed is suspended during that period, the effect of brake control may deteriorate correspondingly. To overcome this problem, brake control may be continued by the brake controller while a great connecting strength acts between both the drive shafts temporarily.

Further, in a vehicle that can change over between two-wheel-drive and four-wheel-drive modes, the connecting state coupling operates during a changeover operation between the two-wheel-drive and four-wheel-drive modes, and a great connecting strength acts between both the drive shafts temporarily. Brake control may also be continued by the brake controller in such a case.

A vehicular brake control apparatus according to a second aspect of the invention comprises (a) a connecting state coupling interposed between a front-wheel drive shaft that transmits a driving force to a front-wheel side and a rear-wheel drive shaft that transmits the driving force to a rear-wheel side, and that changes a connecting state between the front-wheel drive shaft and the rear-wheel drive shaft, (b) brakes, each of which is provided in a corresponding one of wheels to apply a braking force to the corresponding one of the wheels, (c) a controller that performs operation control of the brakes in accordance with a running state of the vehicle and that controls braking forces to be applied to the wheels individually, and restricts changes in the connecting state by the connecting state coupling while brake control is being performed by the controller.

According to the second aspect of the invention, in the circumstance where brake control is being performed by the controller, even if it has been required to perform an operation that necessitates changes in the connecting state between the front-wheel drive shaft and the rear-wheel drive shaft, e.g., to lock the center differential or perform changeover between the two-wheel-drive and the four-wheel-drive modes, changes in the connecting state caused by the connecting state coupling are restricted by the controller. Therefore, changes in the connecting state caused by the controller are restricted, and desirable brake control is performed by the controller.

Further, in a vehicle that can change over between two-wheel-drive and four-wheel-drive modes, the connecting state coupling operates during a changeover operation between the two-wheel-drive and four-wheel-drive modes, and a great connecting strength acts between both the drive shafts temporarily. Thus, while brake control is being performed, the changeover operation between the two-wheel-drive and four-wheel-drive modes may be prohibited by the controller.

Further, both the drive shafts may be prohibited from being locked with respect to each other by the controller even if it has been required, e.g., to lock the center differential while brake control is being performed by the controller.

Further, if it has been required, e.g., to lock the center differential or perform changeover between the two-wheel-drive and four-wheel-drive modes while brake control is being performed by the controller, the required operation may be invalidated (prevented from occurring) through operation of the controller. If the required operation remains invalid even after the running state of the vehicle has been stabilized by brake control, the driver is forced to make the same requirement again. To overcome this problem, the required operation is automatically performed after completion of brake control. Thus, the requirement can be satisfied promptly without forcing the driver to make the same requirement (request) again.

In the above-mentioned first and second aspects of the invention, the controller may individually control braking forces to be applied to the wheels such that turning behavior of the vehicle is stabilized, if turning behavior of the vehicle is in a predetermined state.

Even if the vehicle has assumed a spin or drift-out tendency, this tendency is curbed by the controller constructed as described above. As a result, turning behavior of the vehicle is stabilized.

The aspects of the invention are not to be limited to the vehicular brake control apparatus as described above. According to other aspects of the invention, there is, e.g., provided a vehicle equipped with a brake control apparatus or a vehicular brake control method.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

Hereinafter, embodiments of the invention will be described with reference to the accompanying drawings.

Prior to the description of the embodiments, a method of distributing braking forces to left and right wheels and to front and rear wheels according to the embodiments will be described.

First of all, it will be described how braking forces are distributed to the left and right wheels.

Figure 1:
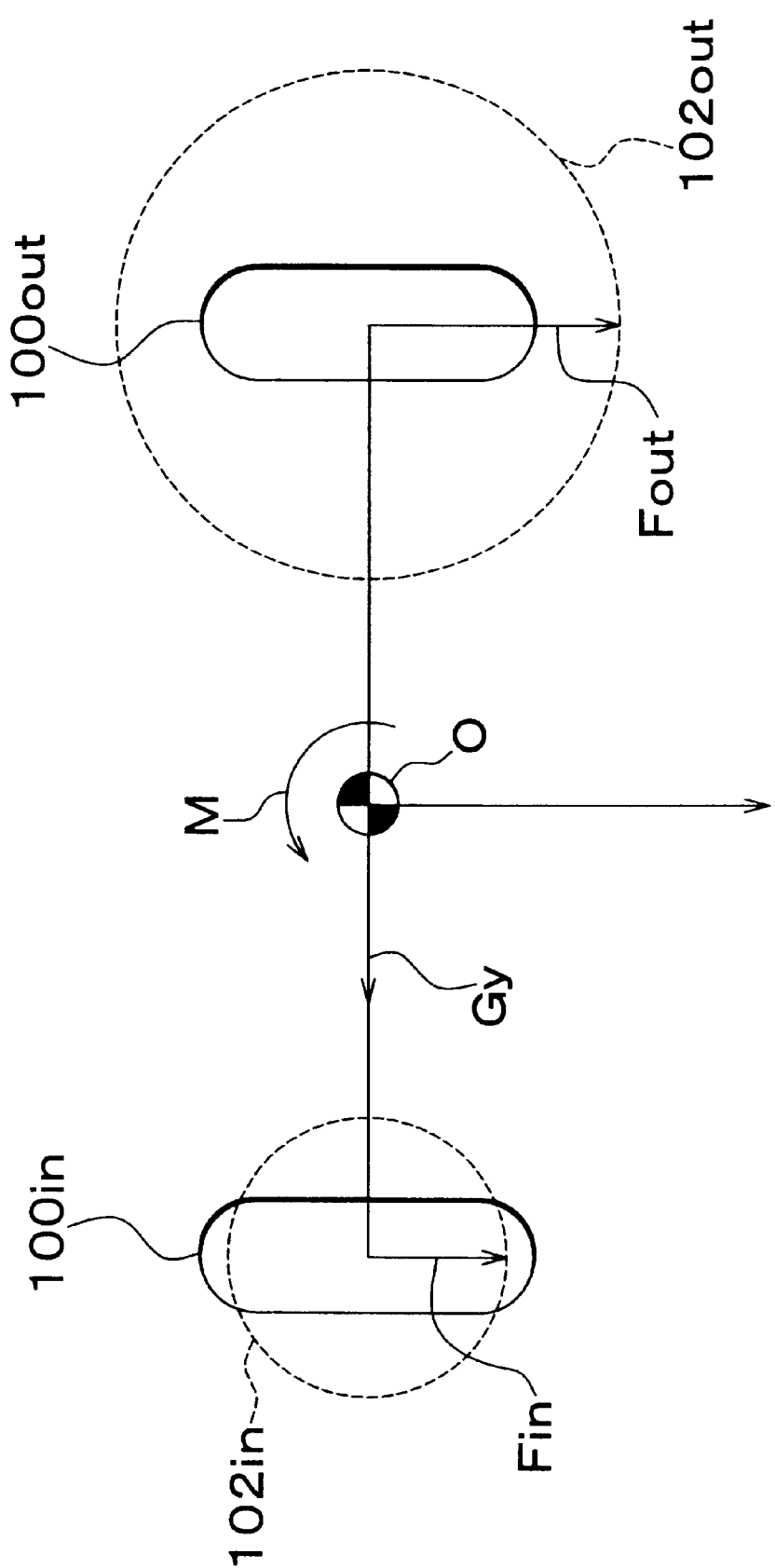
FIG. 1 is an illustrative view showing a vehicle model with two wheels, i.e., a left wheel and a right wheel when the vehicle is making a left turn.

As shown in FIG. 1, it is assumed that a vehicle model with two wheels, i.e., a left wheel and a right wheel and with a wheel base of 0 is making a left turn at a lateral acceleration of Gy. A friction circle 102out of an outside wheel 100out is greater than a friction circle 102in of an inside wheel 100in due to a shift of load. In particular, when assuming that m is a weight of the vehicle, that g is gravitational acceleration, that h is a height of a gravitational center O of the vehicle, and that t is a tread, a diameter Finmax of the friction circle of the inside wheel and a diameter Foutmax of the friction circle of the outside wheel can be expressed respectively by equations (1) and (2) shown below.

$$Finmax = m*g/2 - m*Gy*h/t \quad (1)$$
$$Foutmax = m*g/2 + m*Gy*h/t \quad (2)$$

Figure 2:
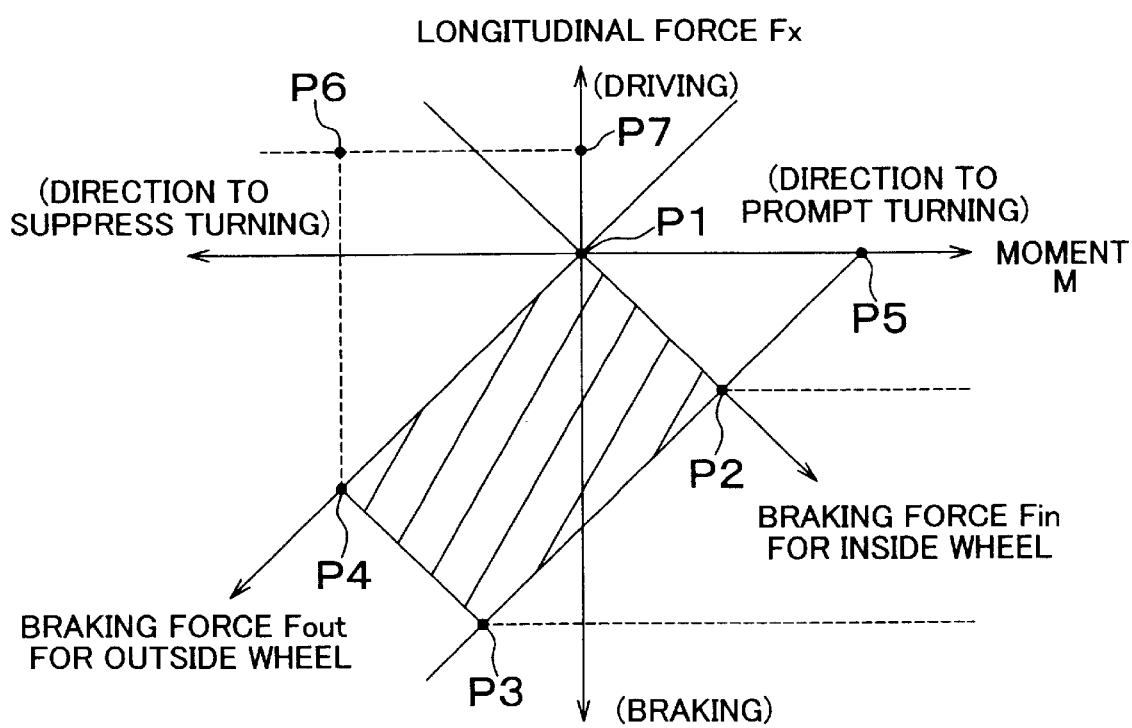
FIG. 2 is a graph showing a relation among moment M, longitudinal force Fx, and braking forces Fin, Fout applied to inside and outside wheels, and so on in the case where the vehicle behavior demonstrates an oversteer tendency.

Thus, in a coordinate system shown in FIG. 2 with the axis of abscissa representing moment M and the axis of ordinate representing longitudinal force Fx, due to application of a braking force, a yaw moment and a longitudinal force applied to the vehicle are within a rectangular area (controllable area), i.e., a hatched area shown in FIG. 2. If a target yaw moment Mt and a target longitudinal force Fx are within the controllable area, target braking forces for the inside wheel and the outside wheel are uniquely calculated by drawing perpendiculars to the axes of braking forces for the inside wheel and the outside wheel respectively from points that are determined by the target yaw moment Mt and the target longitudinal force Fx with the axes of yaw moment and longitudinal force being used as reference axes, and by reading coordinates of the feet of the perpendiculars respectively.

On the other hand, if the target yaw moment Mt and the target longitudinal force Fx are outside the controllable area, the question is how to determine target braking forces for the inside wheel and the outside wheel. In general, if the vehicle behavior demonstrates an oversteer tendency (spin tendency), it is effective to apply an anti-spin moment to the vehicle to stabilize the behavior thereof. Therefore, in this embodiment, while giving priority to attainment of the target yaw moment Mt, it is determined how to distribute braking forces to the left and right wheels.

Thus, as shown in FIG. 2, if the target yaw moment Mt and the target braking force Fx are within an area surrounded by points P1, P4, P6 and P7 (hereinafter referred to as "the spin area"), a target braking force (=0) for the inside wheel and a target braking force for the outside wheel are determined as a coordinate of a point that has been obtained by displacing a point having a coordinate of the target yaw moment and the target longitudinal force onto the axis of outside-wheel braking force in the direction parallel to the axis of longitudinal force.

In general, if the vehicle behavior demonstrates an understeer tendency (drift-out tendency), deceleration (a shift of load caused by deceleration (a moment occurs in such a direction as to assist the turning of the vehicle) and a decrease in vehicle speed) is effective. Therefore, in this embodiment, while giving priority to attainment of the target longitudinal force, it is determined how to distribute braking forces to the left and right wheels.

Thus, if the target yaw moment and the target longitudinal force are between a line that passes through a point P2 and that is parallel to the axis of moment M and a line that passes through a point P3 and that is parallel to the axis of moment M, and are in an area below a line connecting a point P5 with the point P3 (hereinafter referred to as "the drift-out area"), target braking forces for the inside wheel and the outside wheel are determined as a coordinate of a point that has been obtained by displacing a point having a coordinate of the target yaw moment and the target longitudinal force onto a line segment P2–P3 in the direction parallel to the axis of moment.

In an embodiment to be described later, the target yaw moment Mt and the target longitudinal force Fx are not calculated as values that are outside the controllable area, the spin area, and the drift-out area. However, in the case where the target yaw moment and the target longitudinal force are calculated as values that are outside the controllable area, the spin area and the drift-out area, target braking forces are determined as those corresponding to a point that is actually closest to a coordinate having the values and that is on a borderline of the controllable area.

For example, if the target yaw moment and the target longitudinal force are below a line connecting the point P6 with the point P7, above the axis of outside-wheel braking force, and on the left of a line segment P6–P4, target braking forces for the inside wheel and the outside wheel are determined as a coordinate of the point P4. Further, if the target yaw moment and the target longitudinal force are below the axis of outside-wheel braking force, above the line connecting the point P5 with the point P3, and below a line connecting the point P3 with the point P4, target braking forces for the inside wheel and the outside wheel are determined as a coordinate of a point that has been obtained by displacing a point having a coordinate of the target yaw moment and the target longitudinal force onto a line segment P3–P4 in the direction parallel to the axis of outside-wheel braking force.

Further, if the target yaw moment and the target longitudinal force are in a triangular area surrounded by the points P1, P2 and P5, a target braking force for the inside wheel and a target braking force for the outside wheel (=0) are determined as a coordinate of a point that has been obtained by displacing a point having a coordinate of the target yaw moment and the target longitudinal force onto the axis of inside-wheel braking force in the direction parallel to the axis of outside-wheel braking force. If the target yaw moment and the target longitudinal force are above the line that passes through the point P2 and that is parallel to the axis of moment and below the line connecting the point P5 with the point P3, target braking forces for the inside wheel and the outside wheel are determined as a coordinate of the point P2. If the target yaw moment and the target longitudinal force are below the line that passes through the point P3 and that is parallel to the axis of moment and below the line connecting the point P5 with the point P3, target braking forces for the inside wheel and the outside wheel are determined as a coordinate of the point P3.

However, in the case where an oversteer state of the vehicle is controlled, a decrease in side force resulting from application of braking forces causes a problem. Thus, as shown, e.g., in FIG. 3, it is preferable that each of braking forces for the inside wheel and the outside wheel be set as one-third or less of the diameter of the friction circle of a corresponding one of the wheels. If a braking force is about one-third of the diameter of the friction circle, a decrease in side force can be reduced to about 5%.

Figure 4:
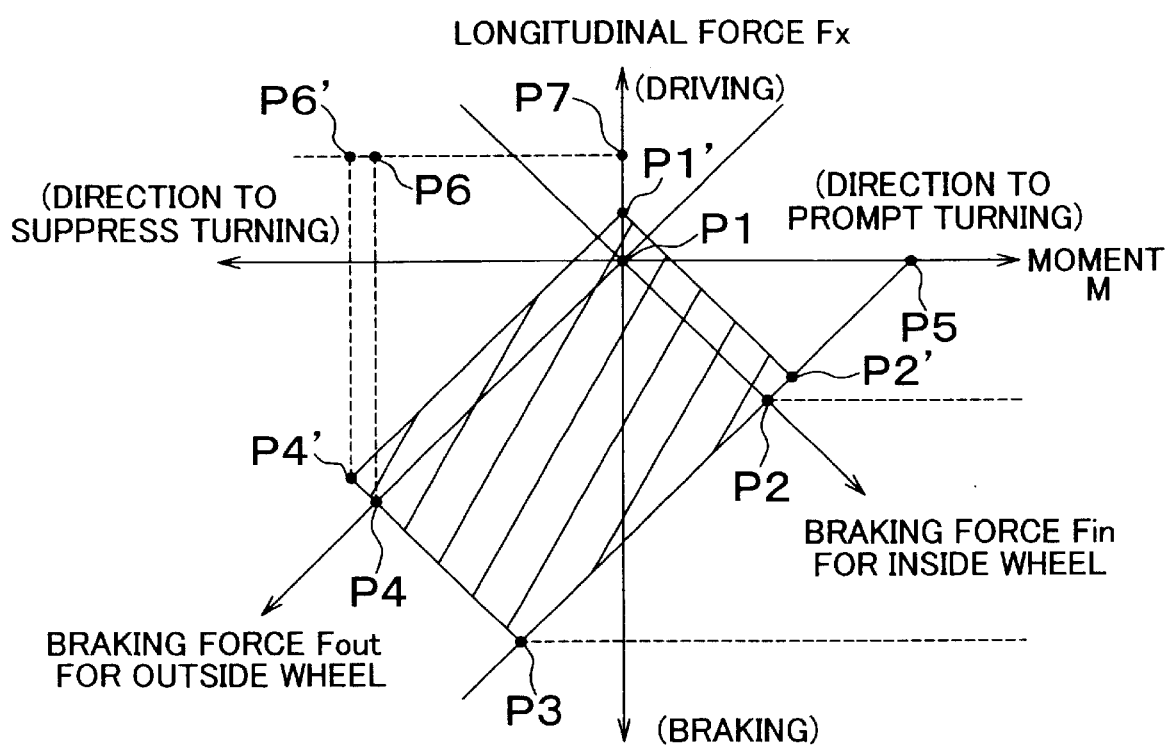
FIG. 4 is a graph showing a relation among moment M, longitudinal force Fx, and braking forces Fin, Fout applied to inside and outside wheels, and so on in the case where the behavior of a vehicle at least front wheels of which are driven demonstrates an oversteer tendency.

Further, in the case of a vehicle at least front wheels of which are driven, such as a four-drive-wheel vehicle, a front-wheel-drive vehicle, or the like, the yaw rate and the longitudinal force that can be applied to the vehicle are in a hatched area shown in FIG. 4. The controllable area shown in FIG. 4 is greater than the controllable area in the case where only braking forces are applied. By controlling only braking forces if the vehicle behavior demonstrates an understeer tendency and additionally using driving forces applied to the wheels if the vehicle behavior demonstrates an oversteer tendency, it becomes possible to apply a greater anti-spin moment to the vehicle and reduce the deceleration of the vehicle.

Next, it will be described how braking forces are distributed to the front and rear wheels.

Figure 5:
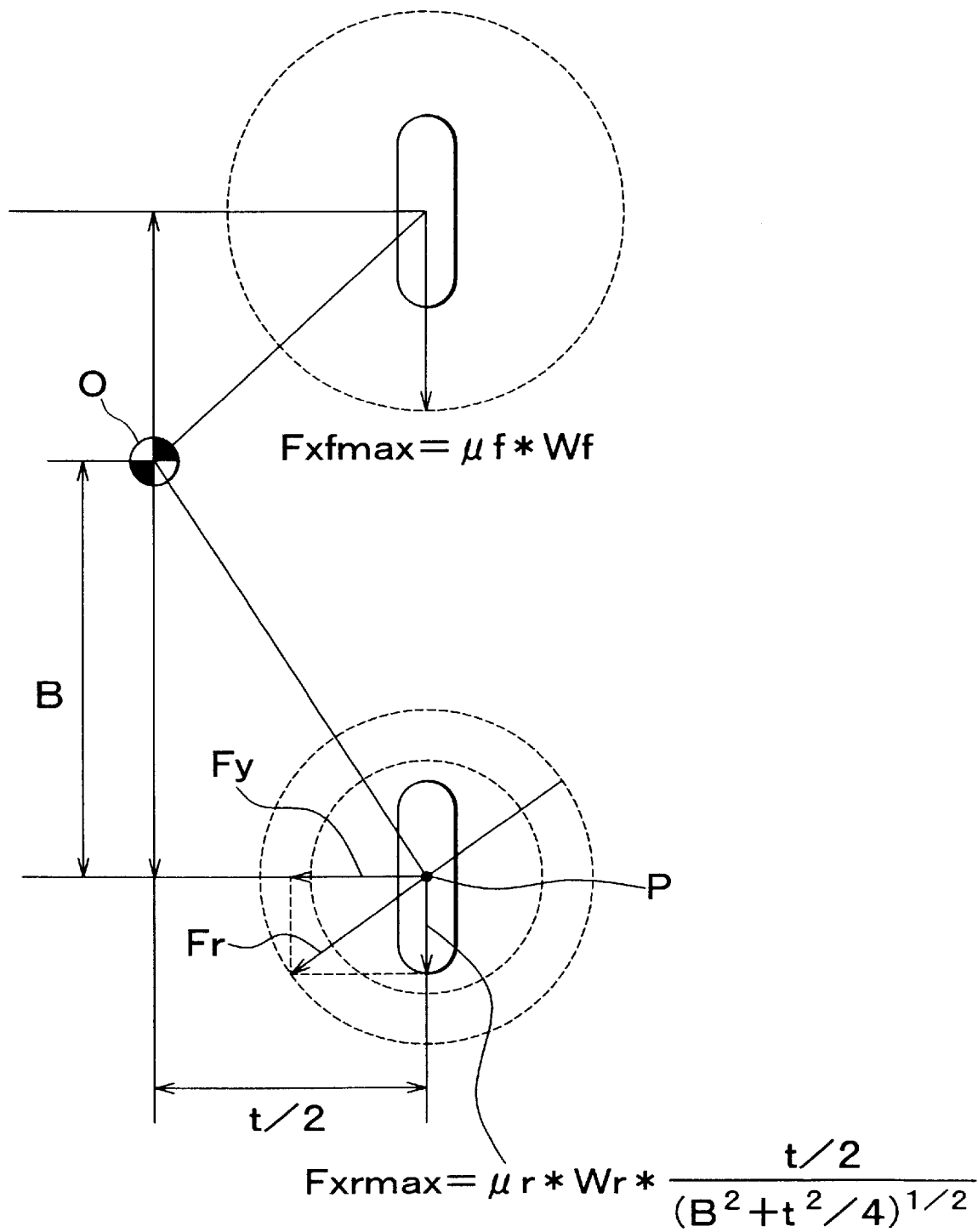
FIG. 5 is an illustrative view showing how to distribute braking forces to front and rear wheels in the case where the vehicle behavior demonstrates an oversteer tendency.

In brake control for an oversteer tendency, the anti-spin moment applied to the vehicle increases in proportion to an increase in the braking force applied to the turning-wise outside front wheel. Therefore, a maximum value Fxfmax of the longitudinal force (braking force) applied to each of the front wheels corresponds to the diameter of the friction circle of the wheel as shown in FIG. 5, and can be expressed by an equation (3) shown below if it is assumed that $\mu f$ is a coefficient of friction between a road surface and the front wheel and that Wf is a load applied to the front wheel.

$$Fxfmax = \mu f * Wf \quad (3)$$

Further, a braking force to be applied to each of the rear wheels must be determined in consideration of both a moment generated by the braking force and a moment that decreases due to a decrease in side force. In other words, as shown in FIG. 5, a maximum value Fxrmax of the braking force applied to each of the rear wheels must be determined such that a resultant force Fr of a braking force Txrmax and a side force Fy is applied perpendicularly to a line connecting the gravitational center O of the vehicle with a grounding point P of the rear wheel when viewed from a location above the vehicle and that the magnitude of the resultant force Fr corresponds to the diameter of the friction circle of the rear wheel. Thus, a maximum value of the braking force applied to each of the rear wheels can be expressed by an equation (4) shown below if it is assumed that B is a distance between the gravitational center O and an axis of rotation of the rear wheel, that $\mu r$ is a coefficient of friction between a road surface and the rear wheel, and that Wr is a load applied to the rear wheel. Braking forces are distributed to the front and rear wheels at a ratio between the maximum value Fxfmax and the maximum value Fxrmax.

$$Fxrmax = \mu r * Wr * (t/2) / (B^2 + t^2/4)^{1/2} \quad (4)$$

Further, in brake control for an understeer tendency, braking forces are distributed to the front and rear wheels at a ratio between the diameters of the friction circles thereof.

Hereinafter, the embodiments of the invention will be described with reference to the drawings.

Figure 6:
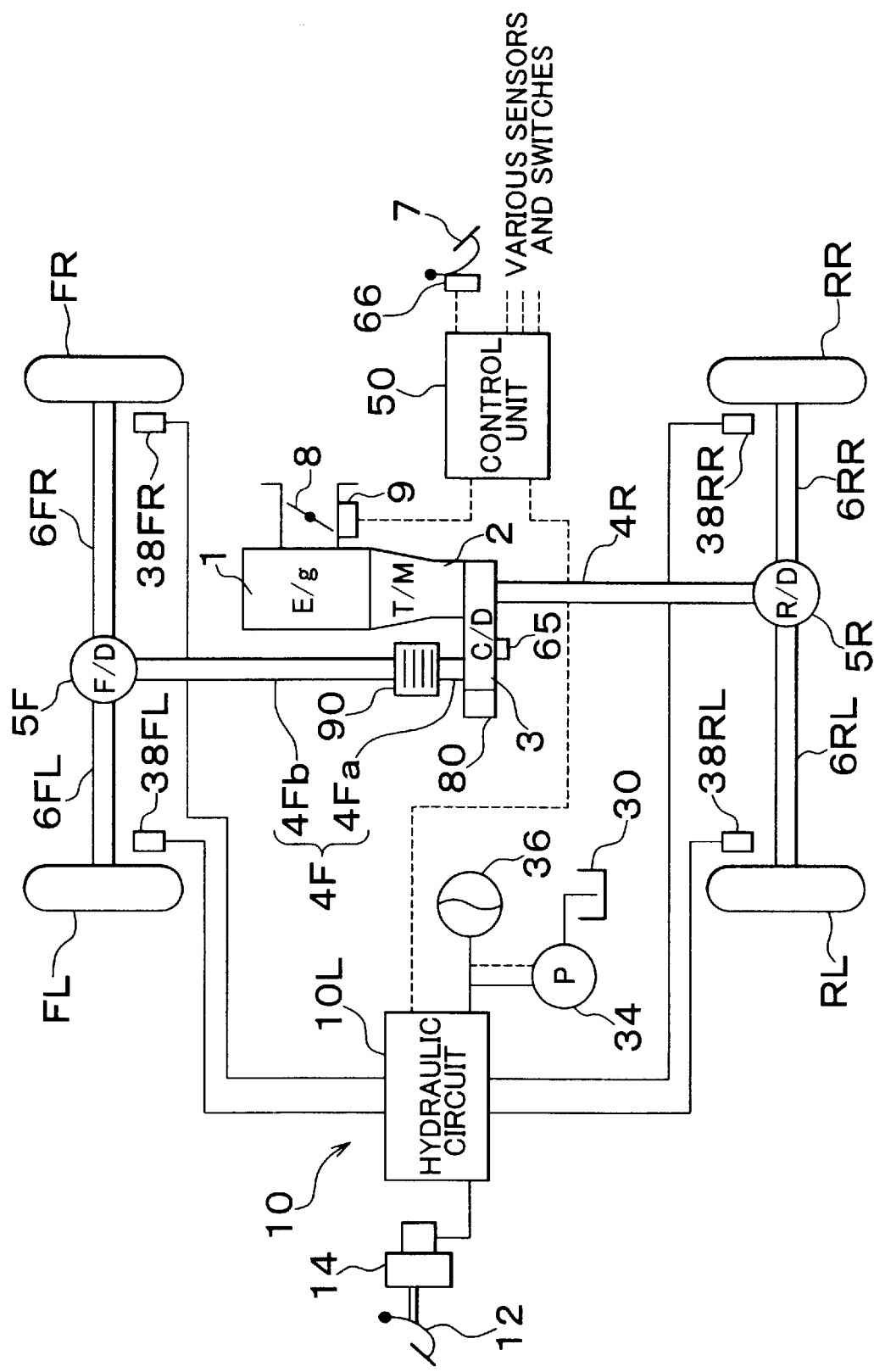
FIG. 6 is a block diagram schematically showing a vehicular brake control apparatus according to an embodiment of the invention.

FIG. 6 schematically shows the construction of a vehicle according to the first embodiment of the invention. This vehicle is equipped with a mechanism capable of changeover between a two-wheel-drive mode and a four-wheel-drive mode.

A rotational output of an engine 1 is changed via a transmission 2 and then distributed to a front-wheel-side drive shaft 4F and a rear-wheel-side drive shaft 4R via a center differential 3. The center differential 3 has a lock mechanism for limiting a differential function thereof. A differential lock actuator 80 is driven through operation by a driver, whereby the center differential 3 is locked and unlocked. The center differential 3 is provided with a differential lock detecting sensor 65 for detecting that the center differential 3 is in its locked state.

The front-wheel-side drive shaft 4F is connected with left and right drive shafts 6FL, 6FR via a front differential 5F, and the rear-wheel-side drive shaft 4R is connected with left and right drive shafts 6RL, 6RR via a rear differential 5R. A driving force from the engine 1 is distributed to wheels FL, FR and wheels RL, RR via the differential SF and the differential 5R respectively.

Furthermore, the front-wheel-side drive shaft 4F has a front-wheel-drive clutch 90 that allows and prohibits application of driving torques to the front wheels FL, FR. A drive shaft 4Fa connects the front-wheel-drive clutch 90 with the center differential 3, and a drive shaft 4Fb connects the clutch 90 with the front differential 5F. The clutch 90 has an actuator (not shown) for connecting the drive shafts 4Fa, 4Fb with each other and disconnecting the drive shafts 4Fa, 4Fb from each other. Connection-disconnection control between the drive shafts 4F*a*, 4F*b* is made possible by performing drive control of the actuator. If the drive shafts 4F*a*, 4F*b* are connected with each other by the clutch 90, rotation of the drive shaft 4F*a* is transmitted to front-wheel-side drive shafts 6FL, 6FR via the drive shaft 4F*b*. Thus, the four-wheel-drive mode in which a driving force from the engine 1 is transmitted to the four wheels FL, FR, RL, RR is established. On the other hand, if the drive shafts 4F*a*, 4F*b* are disconnected from each other by the clutch 90, a system for transmitting driving forces to the front wheels is disconnected. Thus, the rear-wheel-drive mode is established in this case. In this manner, the mechanism is capable of changeover between the drive modes by connecting the drive shafts 4F*a*, 4F*b* with each other and disconnecting the drive shafts 4F*a*, 4F*b* from each other by means of the clutch 90.

A changeover operation between the two-wheel-drive and four-wheel-drive modes will now be described with reference to FIG. 6. First of all, while the vehicle is running in the four-wheel-drive mode, the drive shafts 4F*a*, 4F*b* are connected with each other via the clutch 90. Thus, driving forces are transmitted to the front-wheel-side drive shaft 4F and the rear-wheel-side drive shaft 4R respectively via the center differential 3. In changing over from the four-wheel-drive mode to the two-wheel-drive mode, the drive shaft 4F*a* must be prevented from rotating idly if the clutch 90 has been disconnected afterwards. Thus, first of all, the actuator 80 is operated to lock the center differential 3. In this state, the four-wheel-drive (rigid 4WD) mode in which the front-wheel-side and rear-wheel-side drive shafts 4F, 4R are directly connected with each other is established. Then, an actuator (not shown) is operated to disconnect the clutch 90. Thus, a driving force from the engine 1 is transmitted only to the rear wheels RL, RR, so that the vehicle switches over to the two-wheel-drive mode in which only the rear wheels are driven.

On the other hand, in a changeover operation from the two-wheel-drive mode to the four-wheel-drive mode, first of all, an actuator (not shown) is operated to connect the clutch 90. Because the center differential 3 is in its locked state during the two-wheel-drive mode, the four-wheel-drive (rigid 4WD) mode in which the front-wheel-side and rear-wheel-side drive shafts 4F, 4R are directly connected with each other is established upon connection of the clutch 90. The center differential 3 is unlocked afterwards, whereby the normal four-wheel-drive state is established.

The changeover operation between the two-wheel-drive and four-wheel-drive modes is performed in this manner. Therefore, the center differential 3 assumes its locked state during changeover from the two-wheel-drive mode to the four-wheel-drive mode or vice versa, whereby the rigid 4WD state arises temporarily.

Next, a brake unit 10 will be described.

A hydraulic circuit 10L of the brake unit 10 controls braking pressures in wheel cylinders 38FL, 38FR, 38RL, 38RR, whereby braking forces are applied to the wheels FL, FR, RL, RR respectively.

Figure 7:
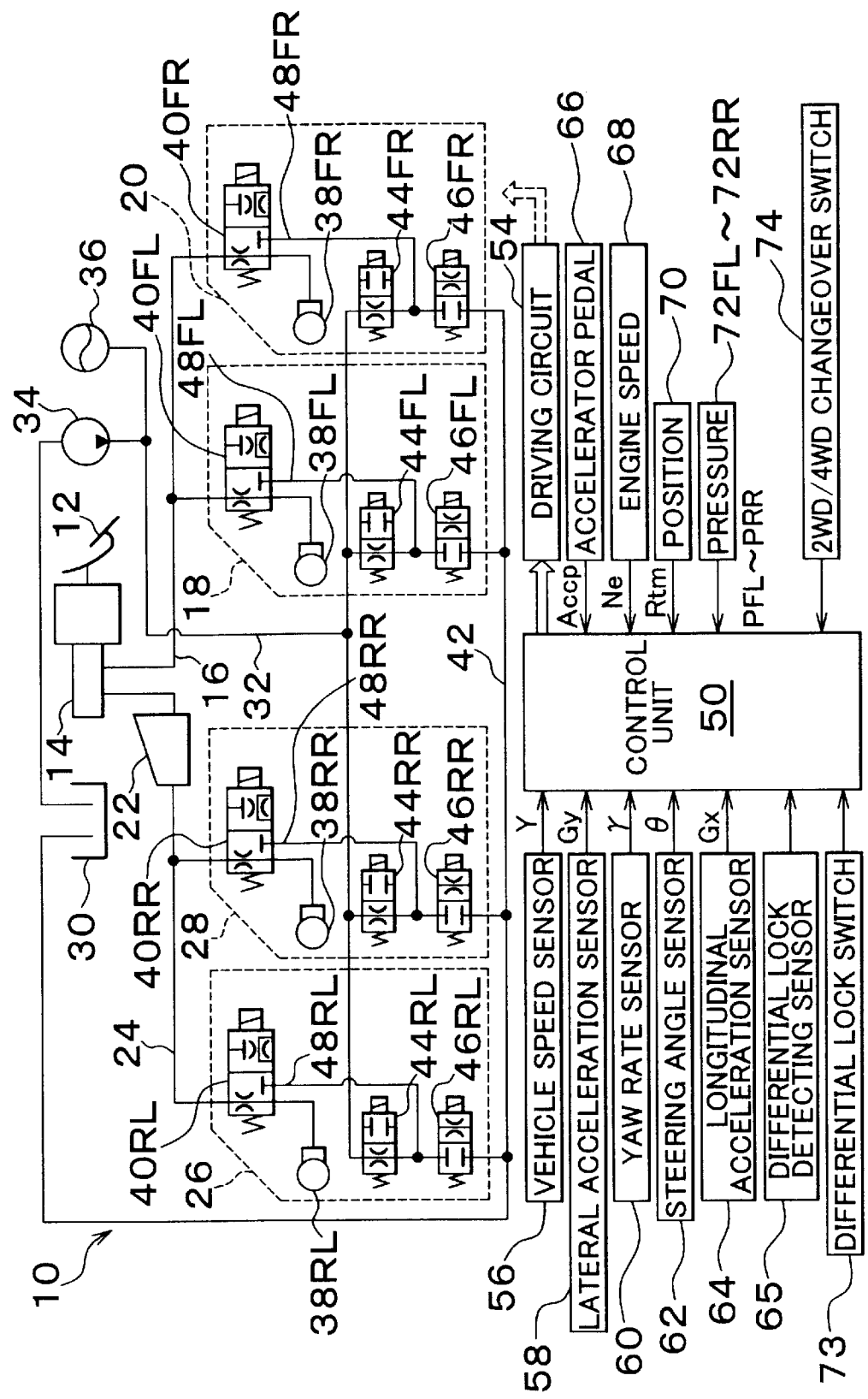
FIG. 7 is a block diagram schematically showing the construction of a braking device.

FIG. 7 shows the construction of the brake unit 10. The brake unit 10 has a master cylinder 14 that force-feeds brake oil from first and second ports in response to depressing operation by a driver. The first port is connected with front-left-wheel and front-right-wheel brake hydraulic pressure control units 18, 20 by a front-wheel brake hydraulic pressure control conduit 16. The second port is connected with rear-left-wheel and rear-right-wheel brake hydraulic pressure control units 26, 28 by a rear-wheel brake hydraulic pressure control conduit 24 extending across a proportional valve 22. Further, the brake unit 10 has an oil pump 34 that draws brake oil stored in a reservoir 30 and supplies a high-pressure conduit 32 with the brake oil as high-pressure oil. The high-pressure conduit 32 is connected with the brake hydraulic pressure control units 18, 20, 26, 28 and also with an accumulator 36.

The brake hydraulic pressure control units 18, 20, 26, 28 include the wheel cylinders 38FL, 38FR, 38RL, 38RR, each of which controls the braking force applied to a corresponding one of the wheels, three-port two-position changeover type electromagnetic control valves 40FL, 40FR, 40RL, 40RR, normal-open type electromagnetic open-close valves 44FL, 44FR, 44RL, 44RR that are provided between the high-pressure conduit 32 and a low-pressure conduit 42 connected with the reservoir 30, and normal-closed type electromagnetic open-close valves 46FL, 46FR, 46RL, 46RR, respectively. The high-pressure conduit 32 is connected between the open-close valves 44FL, 46FL, between the open-close valves 44FR, 46FR, between the open-close valves 44RL, 46RL, and between the open-close valves 44RR, 46RR with the control valves 40FL, 40FR, 40RL, 40RR respectively, by connection conduits 48FL, 48FR, 48RL, 48RR respectively.

The control valves 40FL, 40FR bring the front-wheel brake hydraulic pressure control conduit 16 into communication with the wheel cylinders 38FL, 38FR respectively. The control valves 40FL, 40FR change over between their first positions shown in FIG. 7 where the wheel cylinders 38FL, 38FR are out of communication with the connection conduits 48FL, 48FR respectively and their second positions where the brake hydraulic pressure control conduit 16 is out of communication with the wheel cylinders 38FL, 38FR and where the wheel cylinders 38FL, 38FR are in communication with the connection conduits 48FL, 48FR respectively. Likewise, the control valves 40RL, 40RR bring the rear-wheel brake hydraulic pressure control conduit 24 into communication with the wheel cylinders 38RL, 38RR respectively. The control valves 40RL, 40RR change over between their first positions shown in FIG. 7 where the wheel cylinders 38RL, 38RR are out of communication with the connection conduits 48RL, 48RR respectively and their second positions where the brake hydraulic pressure control conduit 24 is out of communication with the wheel cylinders 38RL, 38RR and where the wheel cylinders 38RL, 38RR are in communication with the connection conduits 48RL, 48RR.

In the circumstance where the control valves 40FL, 40FR, 40RL, 40RR are at their second positions, if the open-close valves 44FL, 44FR, 44RL, 44RR and the open-close valves 46FL, 46FR, 46RL, 46RR are controlled as shown in FIG. 7, the wheel cylinders 38FL, 38FR, 38RL, 38RR are brought into communication with the high-pressure conduit 32 via the control valves 40FL, 40FR, 40RL, 40RR and the connection conduits 48FL, 48FR, 48RL, 48RR respectively. Thus, pressures in the wheel cylinders 38FL, 38FR, 38RL, 38RR are increased. To the contrary, in the circumstance where the control valves 40FL, 40FR, 40RL, 40RR are at their second positions, if the open-close valves 44FL, 44FR, 44RL, 44RR are closed and if the open-close valves 46FL, 46FR, 46RL, 46RR are opened, the wheel cylinders 38FL, 38FR, 38RL, 38RR are brought into communication with the low-pressure conduit 42 via the control valves 40FL, 40FR, 40RL, 40RR and the connection conduits 48FL, 48FR, 48RL, 48RR respectively. Thus, pressures in the wheel cylinders 38FL, 38FR, 38RL, 38RR are reduced. Furthermore, in the circumstance where the control valves 40FL, 40FR, 40RL, 40RR are at their second positions, if the open-close valves 44FL, 44FR, 44RL, 44RR and the open-close valves 46FL, 46FR, 46RL, 46RR are closed, the wheel cylinders 38FL, 38FR, 38RL, 38RR are disconnected from both the high-pressure conduit 32 and the low-pressure conduit 42. Thus, pressures in the wheel cylinders 38FL, 38FR, 38RL, 38RR are maintained as they are.

Thus, the brake unit 10 generates braking forces corresponding to a depression amount of a driver-operated brake pedal 12 by means of the wheel cylinders 38FL, 38FR, 38RL, 38RR if the control valves 40FL, 40FR, 40RL, 40RR are at their first positions, and performs open-close control of a corresponding one of the open-close valves 44FL, 44FR, 44RL, 44RR and a corresponding one of the open-close valves 46FL, 46FR, 46RL, 46RR if any one of the control valves 40FL, 40FR, 40RL, 40RR is at its second position. Thus, a braking force applied to a specific one of the wheels can be controlled regardless of a depression amount of the brake pedal 12 or braking forces applied to the other wheels.

Further, a control unit 50 is supplied with detection results and information on switch operations from a vehicle speed sensor 56 for detecting a vehicle speed V, a lateral acceleration sensor 58 for detecting a lateral acceleration Gy applied to the vehicle body, a yaw rate sensor 60 for detecting a yaw rate γ applied to the vehicle body, a steering angle sensor 62 for detecting a steering angle θ, a longitudinal acceleration sensor 64 for detecting a longitudinal acceleration applied to the vehicle body, the differential lock detecting sensor 65 for detecting a locked state of the center differential 3, an accelerator pedal sensor 66 for detecting a depression amount Accp of an accelerator pedal 7, an engine speed sensor 68 for detecting an engine speed Ne, a shift position sensor 70 for detecting a speed-change stage (speed-change ratio Rtm) of the transmission 2, pressure sensors 72FL, 72FR, 72RL, 72RR for detecting pressures (braking pressures) in the wheel cylinders 38FL, 38FR, 38RL, 38RR respectively, a differential lock switch 73 for performing operations of requiring locking and unlocking of the differential, a 2WD/4WD changeover switch 74 for performing operations of changeover between the 2WD and 4WD modes, and so on. Based on the detection results and the information on switch operations, the control unit 50 performs various types of control such as operation control of the brake unit 10, drive control of a throttle motor 9 for changing an opening amount of a throttle valve 8, output control of the engine 1, operation control of the differential lock actuator 80, 2WD-4WD changeover operation control, control for connecting and disconnecting the clutch 90, and so on. The lateral acceleration sensor 58 and the like detect a lateral acceleration and the like on the assumption that the direction in which the vehicle makes a left turn is positive.

Figure 8:
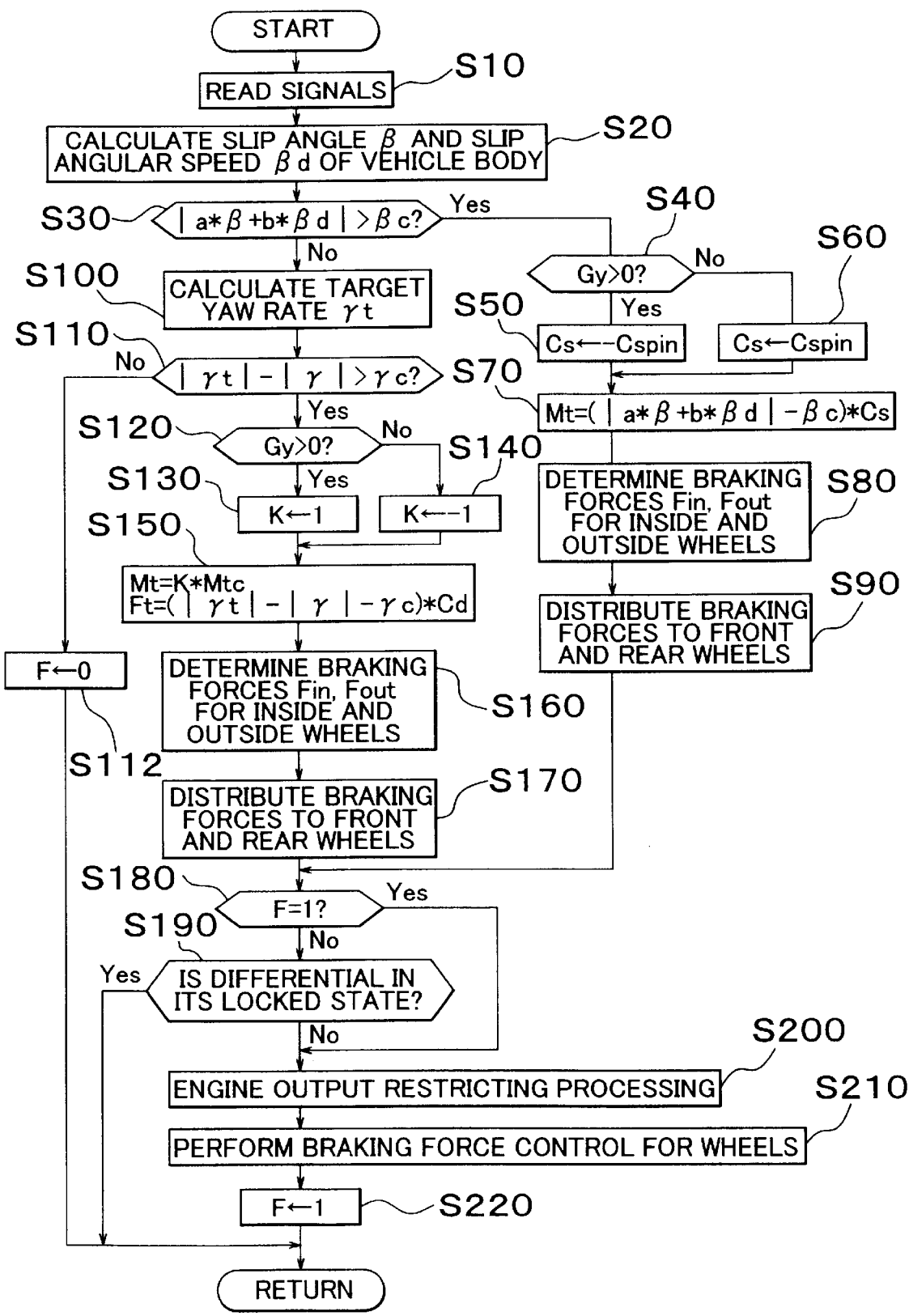
FIG. 8 is a flowchart showing behavior control of the vehicle performed in the braking device.

Brake control performed by the control unit 50 to stabilize turning behavior of the vehicle will now be described with reference to the flowchart shown in FIG. 8. The flowchart shown in FIG. 8 is started by turning an ignition switch on.

First of all, in step (hereinafter referred to as "S") 10, detection results of the sensors, such as the vehicle speed sensor 56 are read.

In S20, a lateral acceleration difference (sideslip acceleration of the vehicle) Vyd is calculated as a difference Gy-V*γ between a product V*γ of the vehicle speed V and the yaw rate γ and the lateral acceleration Gy. By integrating the lateral acceleration difference Vyd, a sideslip speed Vy of the vehicle is calculated. A slip angle β of the vehicle is calculated as a ratio Vy/Vx of the sideslip speed Vy of the vehicle to the longitudinal speed Vx (=the vehicle speed V). Also, a slip angular speed β̇ of the vehicle is calculated as a derivative of the slip angle β of the vehicle.

In S30, using positive constants a and b, it is determined whether or not the absolute value of a linear sum a*β+b*β̇d is greater than a reference value βc (positive constant), i.e., whether or not the vehicle is about to demonstrate a spin tendency.

If the result in S30 is "Yes", i.e., if it has been determined that the vehicle is about to demonstrate a spin tendency, operation proceeds to S40 where it is determined whether or not the lateral acceleration Gy is positive, i.e., whether or not the vehicle is making a left turn. If the vehicle is making a left turn, operation proceeds to S50 where, using a positive constant Cspin, a coefficient Cs in an equation (5) shown below is set as −Cspin. If the vehicle is making a right turn, operation proceeds to S60 where the coefficient Cs is set as Cspin.

In S70, a target yaw moment Mt is calculated based on the equation (5) shown below, and a target longitudinal force Ft is set as Ftc (constant).

$$Mt=(|a*\beta+b*\dot\beta d|-\beta c)*Cs \tag{5}$$

In S80, a diameter Finmax of the friction circle of the inside wheel and a diameter Foutmax of the friction circle of the outside wheel are calculated according to the equations (1), (2) respectively, whereby the points P2 to P5 in a map shown in FIG. 4 as an example are determined. Based on the depression amount Accp of the accelerator pedal 7 and the engine speed Ne, an output torque Te of the engine 1 is calculated using a prescribed map. Based on the output torque Te and the speed-change ratio Rtm of the transmission 2, a driving force Fdin for the inside wheel and a driving force Fdout for the outside wheel are calculated using a predetermined map. Thus, points P1', P4', P6' are determined. Based on the thus-determined map shown in FIG. 4, a braking force Fout for the outside wheels is determined using the above-described method.

Figure 9:
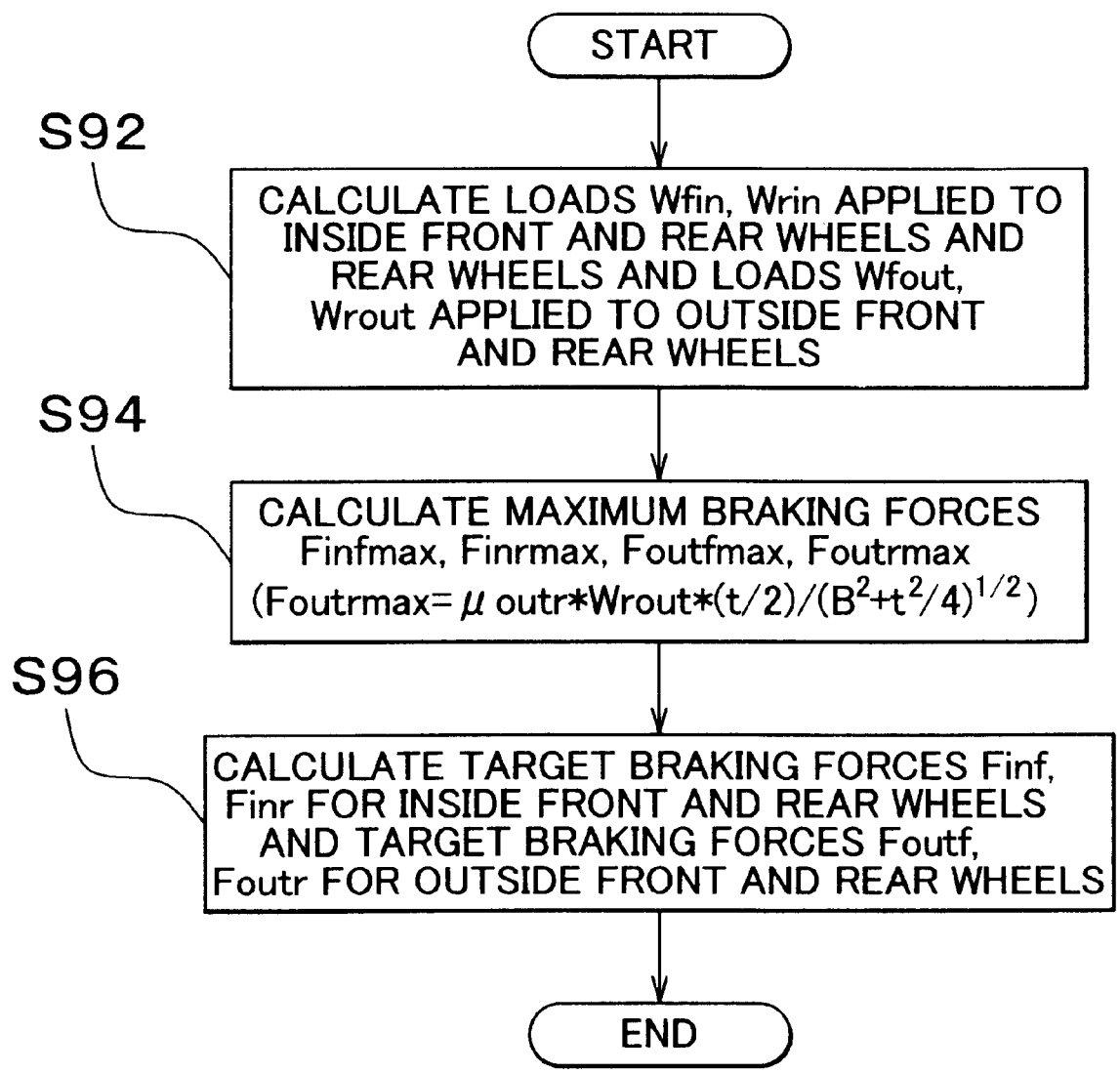
FIG. 9 is a flowchart showing a processing performed in step S90, in which braking forces are distributed to front and rear wheels.

In S90, the braking force Fout for the outside wheels is distributed to the front and rear wheels according to a flowchart shown in FIG. 9, whereby target braking forces for the turning-wise outside front and rear wheels are calculated.

In the flowchart shown in FIG. 9, first of all in S92, using a front-wheel-side mass mf of the vehicle, a rear-wheel-side mass mr of the vehicle, and a roll rigidity distribution Cfr of the vehicle, a load Wfin applied to the turning-wise inside front wheel and a load Wrin applied to the turning-wise inside rear wheel are calculated respectively according to equations (6), (7) shown below, based on the longitudinal acceleration Gx and the lateral acceleration Gy. Further, based on the longitudinal acceleration Gx and the lateral acceleration Gy, a load Wfout applied to the turning-wise outside front wheel and a load Wrout applied to the turning-wise outside rear wheel are calculated respectively according to equations (8), (9) shown below.

$$Wfin=mf*g/2-m*Gx*h-Cfr*m*Gy*h/t \tag{6}$$

$$Wrin=mr*g/2+m*Gx*h-(1-Cfr)*m*Gy*h/t \tag{7}$$

$$Wfout=mf*g/2-m*Gx*h+Cfr*m*Gy*h/t \tag{8}$$

$$Wrout=mr*g/2+m*Gx*h+(1-Cfr)*m*Gy*h/t \tag{9}$$

In S94, using a coefficient μinf of friction between the road surface and the turning-wise inside front wheel and a coefficient μinr of friction between the road surface and the turning-wise inside rear wheel, a maximum value Finfmax of the braking force that can be applied to the turning-wise inside front wheel and a maximum value Finrmax of the braking force that can be applied to the turning-wise inside rear wheel are calculated respectively according to equations (10), (11), which correspond to the equations (3), (4) respectively. Further, using a coefficient μoutf of friction between the road surface and the turning-wise outside front wheel and a coefficient μoutr of friction between the road surface and the turning-wise outside rear wheel, a maximum value Foutfmax of the braking force that can be applied to the turning-wise outside front wheel and a maximum value Foutrmax of the braking force that can be applied to the turning-wise outside rear wheel are calculated respectively according to equations (12), (13), which correspond to the equations (3), (4) respectively.

$$Finfmax = \mu inf * Wfin \tag{10}$$

$$Finrmax = \mu inr * Wrin \tag{11}$$

$$Foutfmax = \mu outf * Wfout \tag{12}$$

$$Foutrmax = \mu out * Wrout * (t/2)/(B^2 + t^2/4)^{1/2} \tag{13}$$

In S96, the braking force Fin for the inside wheels is distributed at a ratio between the maximum braking forces Finfinax, Finrmax according to equations (14), (15) shown below, whereby a target braking force Finf for the turning-wise inside front wheel and a target braking force Finr for the turning-wise inside rear wheel are calculated respectively. Further, the braking force Fout for the outside wheels is distributed at a ratio between the maximum braking forces Foutfmax, Foutrmax according to equations (16), (17) shown below, whereby a target braking force Foutf for the turning-wise outside front wheel and a target braking force Foutr for the turning-wise outside rear wheel are calculated respectively. Then, the processing shown as S90 is terminated.

$$Finf = Fin * Finfmax/(Finfinax + Finrmax) \tag{14}$$

$$Finr = Fin * Finrmax/(Finfmax + Finrmax) \tag{15}$$

$$Foutf = Fout * Foutfmax/(Foutfmax + Foutrmax) \tag{16}$$

$$Foutr = Fout * Foutrmax/(Foutfmax + Foutrmax) \tag{17}$$

Referring again to the flowchart shown in FIG. 8, if the result in S30 is "No", i.e., if it has been determined that the vehicle does not demonstrate a spin tendency, operation proceeds to S100 where, using a stability factor Kh and a wheel base L, a reference yaw rate γc is calculated according to an equation (18) shown below. Further, using a time constant T and a Laplace operator s, a target yaw rate γt is calculated according to an equation (19) shown below.

$$\gamma c = V * \theta * (1 + Kh * V^2) * L \tag{18}$$

$$\gamma t = \gamma c/(1 + T * S) \tag{19}$$

In S110, it is determined whether or not a difference |γt|−|γ| between the absolute value of the target yaw rate γt and the absolute value of an actual yaw rate γ of the vehicle has exceeded a reference value γc (positive constant), i.e., whether or not the vehicle is about to demonstrate a drift-out tendency.

If the result in S110 is "No", the vehicle does not demonstrate a drift-out tendency. Besides, it has been determined in S30 that the vehicle does not demonstrate a spin tendency. Therefore, if the result in S110 is "No", the vehicle is running stably. In this case, operation proceeds to S112 where a performance flag F indicating whether or not behavior control is being performed is set as F=0 to indicate that behavior control is not being performed. Then, the present routine is terminated.

On the other hand, if the result in S110 is "Yes", i.e., if it has been determined that the vehicle demonstrates a drift-out tendency, operation proceeds to S120 where it is determined whether or not the lateral acceleration Gy is positive, i.e., whether or not the vehicle is making a left turn. If the result in S120 is "Yes", operation proceeds to S130 where a coefficient K is set as 1. If the result in S120 is "No", operation proceeds to S140 where the coefficient K is set as −1.

Operation proceeds to S150 after S130 or S140. In S150, using a constant Mtc, the target yaw moment Mt is set as K*Mtc, and the target longitudinal force Ft is calculated according to an equation (20) shown below.

$$Ft = (|\gamma t| - |\gamma| - \gamma c) * Cd \tag{20}$$

Figure 3:
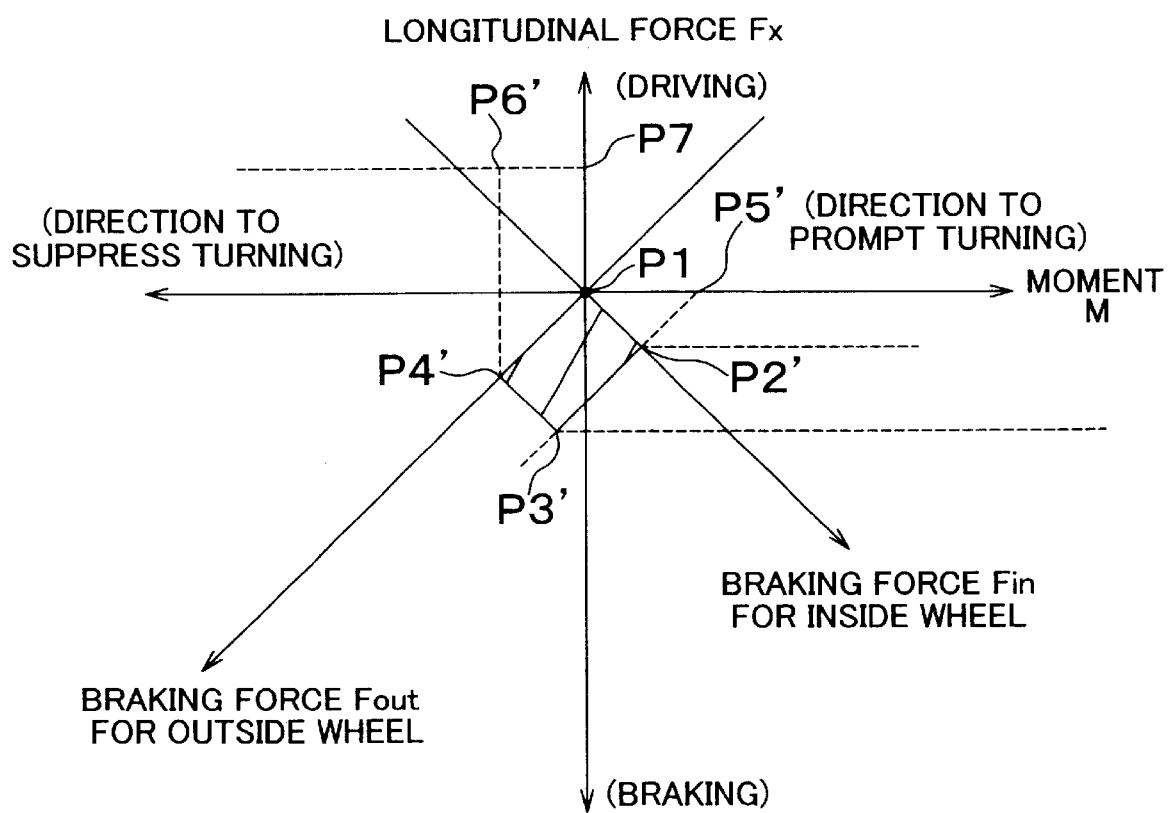
FIG. 3 is a graph showing a relation among moment M, longitudinal force Fx, and braking forces Fin, Fout applied to inside and outside wheels, and so on in the case where the vehicle behavior demonstrates an understeer tendency.

In S160, the diameter Finmax of the friction circle of the inside wheels and the diameter Foutmax of the friction circle of the outside wheels are calculated according to the equations (1), (2) respectively. Based on one-third of each of the diameters, points P2' to P6' in the map shown in FIG. 3 are determined. Based on the thus-determined map shown in FIG. 3, a braking force Fin for the inside wheels and a braking force Fout for the outside wheels are determined according to the above-mentioned method.

Figure 10:
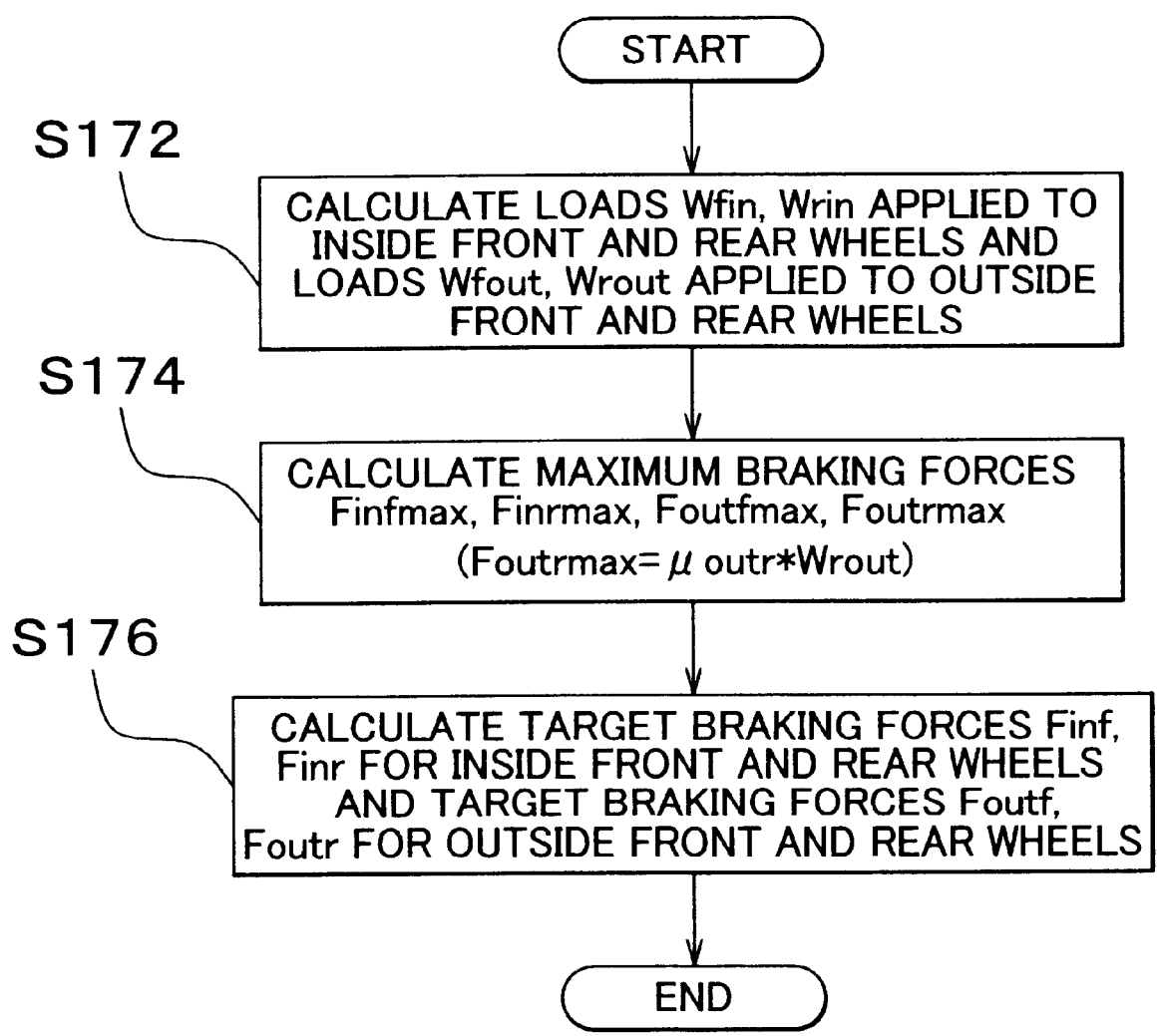
FIG. 10 is a flowchart showing a processing performed in step S170, in which braking forces are distributed to the front and rear wheels.

In S170, each of the braking force Fin for the inside wheels and the braking force Fout for the outside wheels is distributed to the front and rear wheels according to a flowchart shown in FIG. 10, whereby a target braking force for each of the wheels is calculated. The same processings as in S92 to S96 in the flowchart shown in FIG. 9 are performed in S172 to S176 in the flowchart shown in FIG. 10. However, in S174, a maximum value Foutrmax of the braking force that can be applied to the turning-wise outside rear wheel is calculated according to an equation (21) shown below.

$$Foutrmax = \mu inr * Wrin \tag{21}$$

In S180, a performance flag F indicating whether or not braking force control is being performed is checked. If F=1, the performance flag F indicates that braking force control is being performed. The performance flag F is set as F=0 immediately before fulfillment of conditions for performing braking force control. Thus, the result in S180 is "No", and operation proceeds to S190.

In S190, it is determined whether or not the center differential 3 is in its locked state. For example, if the differential lock detecting sensor 65 has detected a locked state of the differential or if an operation of requiring locking the differential has been performed through operation of the differential lock switch 73, it is determined that the center differential 3 is in its locked state. As described above, the center differential 3 assumes its locked state temporarily during the 2WD-4WD changeover operation. Thus, if an operation of requiring 2WD-4WD changeover has been performed through operation of the changeover switch 74, it may be determined, until completion of the changeover operation, that the center differential 3 is in its locked state.

If the result in S190 is "No", i.e., if it has been determined that the center differential 3 is not in its locked state, operation proceeds to S200 where an engine output restricting processing is performed. To be more specific, this is a process of reducing engine output by automatically throttling the throttle valve 8 in accordance with vehicle state quantities that are input in S30 or S110 or the like. The opening of the throttle valve 8 is normally determined in accordance with a depression amount Accp of the accelerator pedal 7 detected by the accelerator pedal sensor 66. However, while braking force control is being performed to stabilize turning behavior of the vehicle by means of the control unit 10 as mentioned above, the throttle motor 9 is driven irrespective of the depression amount Accp of the accelerator pedal 7 under control of the control unit 50, and the throttle valve 8 is driven so as to be displaced to a predetermined close-side opening.

The opening of the throttle valve, which depends on the vehicle state quantities indicative of a spin tendency, a drift-out tendency, and so on of the vehicle, is mapped in advance. In S200, the map is searched through based on the grasped vehicle state quantities, whereby an opening of the throttle valve is determined. The throttle motor 9 is driven in accordance with the determined opening of the throttle valve.

In S210, braking force control for the wheels FL, FR, RL, RR is performed. In S210, a target braking pressure in the wheel cylinder 38i (i=FL, FR, RL, RR) of each of the wheels is calculated based on the target braking force for a corresponding one of the wheels calculated in S90 or S170. Further, a duty ratio Dir is calculated according to an equation (22) shown below. In the equation (22), Kp is a gain coefficient of a proportional term of feedback control of controlled pressures, Kd is a gain coefficient of a derivative term of feedback control of controlled pressures, Pi is a wheel cylinder pressure of each of the wheels, and Pti is a target wheel cylinder pressure for each of the wheels.

$$Dir=Kp*(Pi-Pti)+Kd*d(Pi-Pti)/dt \qquad (22)$$

Further, a control signal is output to the control valve 40i of a corresponding one of the wheels whose braking pressure is to be increased or reduced, whereby the control valve 40i changes over to its second position. Further, a control signal corresponding to the duty ratio Dir is output to the open-close valve of the turning-wise outside wheel, so that application of an accumulator pressure to the wheel cylinder 38 and release of the accumulator pressure are controlled. The braking pressure is increased or reduced through such control operation, and control is performed such that the braking force becomes equal to the target braking force.

In this case, if the duty ratio Dir is between a negative reference value and a positive reference value, the upstream open-close valve is changed over to its second position, and the downstream open-close valve is maintained in its first position. Thus, the pressure in a corresponding one of the wheel cylinders is maintained. Further, if the duty ratio Dir is equal to or greater than the positive reference value, the upstream and downstream open-close valves of the turning-wise outside wheels are controlled so as to assume the positions shown in FIG. 2, whereby an accumulator pressure is supplied to a corresponding one of the wheel cylinders. Thus, the pressure in the wheel cylinder is increased. Further, if the duty ratio Dir is equal to or smaller than the negative reference value, the upstream and downstream open-close valves of the turning-wise outside wheels are changed over to their second positions, whereby brake oil in a corresponding one of the wheel cylinders is discharged to the low-pressure conduit 42. As a result, the pressure in the wheel cylinder is reduced.

After such processings have been performed in S210, operation proceeds to S220 where the performance flag F is set as F=1 to indicate that braking force control is being performed. Then, the present routine is terminated.

On the other hand, if the result in S190 is "Yes", i.e., if it has been determined that the differential is in its locked state, the present routine is terminated immediately. Namely, while the center differential 3 is in its locked state, even if conditions for starting braking force control have been fulfilled in the meantime, braking force control is prohibited from being started. If the center differential 3 assumes its locked state, a difference in rotational speed between the front wheels FL, FR and the rear wheels RL, RR is fixed. Thus, in comparison with the case where the center differential 3 is free, the balance between the front and rear wheels changes as to the magnitude of anti-spin moment and the side forces applied to tires. Therefore, if the center differential 3 is in its locked state, braking force control for the wheels is prohibited from being started.

On the other hand, once braking force control has been started and the performance flag F has been set as F=1, the result in S180 is "Yes". Then, operation proceeds to S200 without performing the processing in S190. Thus, for example, even in the case where a 2WD-4WD changeover requirement has been made during braking force control, where the center differential 3 has been locked in the course of the changeover operation, and where a direct-connected four-wheel-drive state has arisen temporarily, the engine output restricting processing (S200) and braking force control (S210) are continued. If braking force control is canceled as soon as the center differential 3 assumes its locked state, braking force control is canceled immediately under the circumstance where the turning behavior of the vehicle is about to be stabilized. In some cases, the effect of stabilization control of the turning behavior may not be achieved sufficiently. Thus, even if the center differential 3 has assumed its locked state while braking force control is being performed, braking force control is continued.

If the vehicle has ceased to demonstrate a spin tendency or a drift-out tendency due to the control processings as described above, the result in S110 is "No". Then, operation proceeds to S112 where the performance flag F is reset as F=0 to indicate that previously performed braking force control has been terminated.

Figure 12:
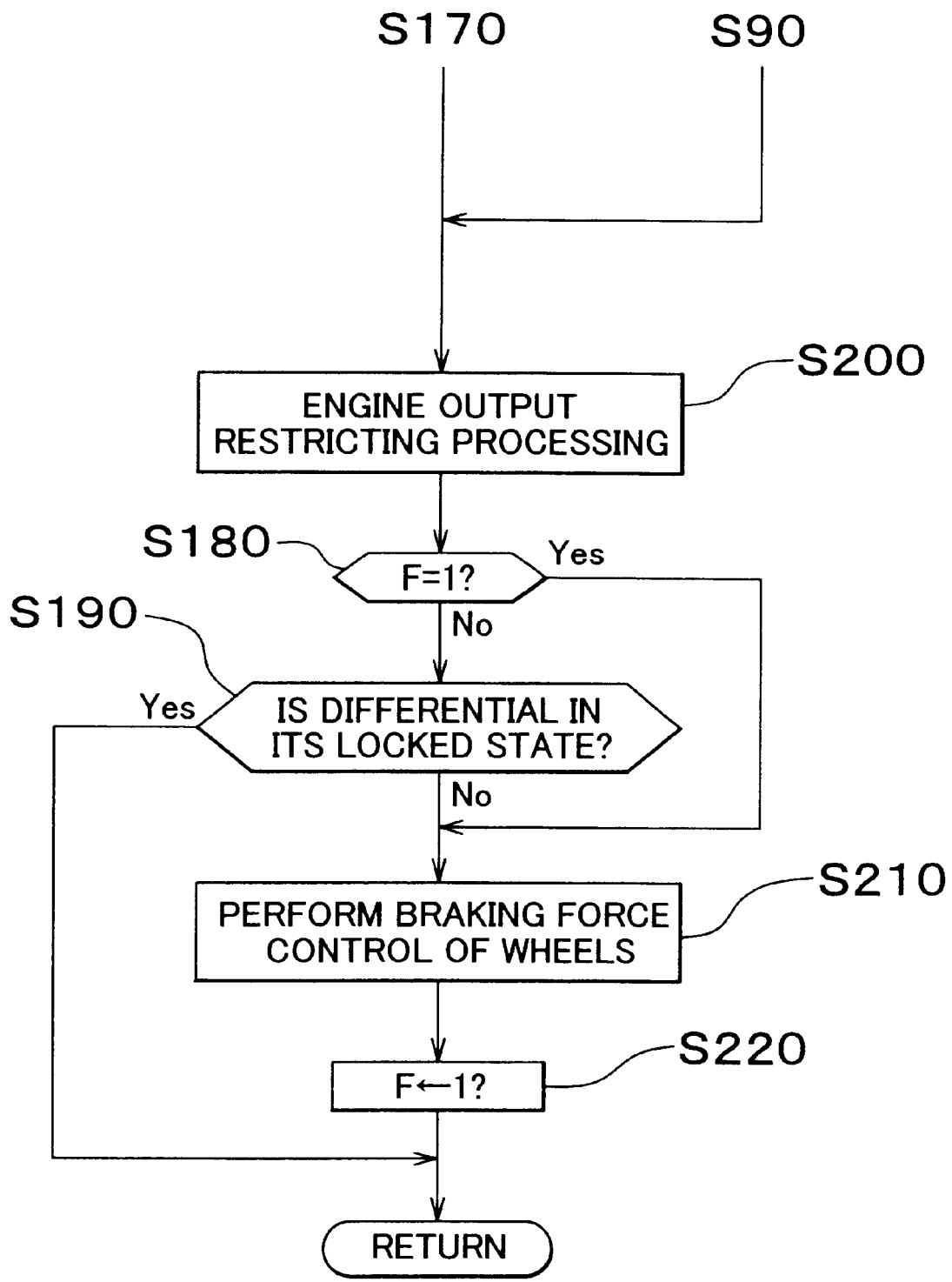
FIG. 12 is a flowchart showing brake control performed in the braking device according to another embodiment of the invention.

A flowchart as shown in FIG. 12 may also be employed. According to this flowchart, after S90 or S170, operation proceeds to S200 where the engine output restricting processing is performed. Thus, if it has been determined that the vehicle behavior demonstrates a spin tendency or a drift-out tendency, and if control operation has reached S90 or S170, the engine output restricting processing (S200) never fails to be performed regardless of whether or not braking force control (S210) is actually performed. Thus, the vehicle speed V is reduced, and the vehicle state can be shifted in such a direction as to ensure running stability of the vehicle.

Next, a second embodiment of the invention will be described.

Figure 11:
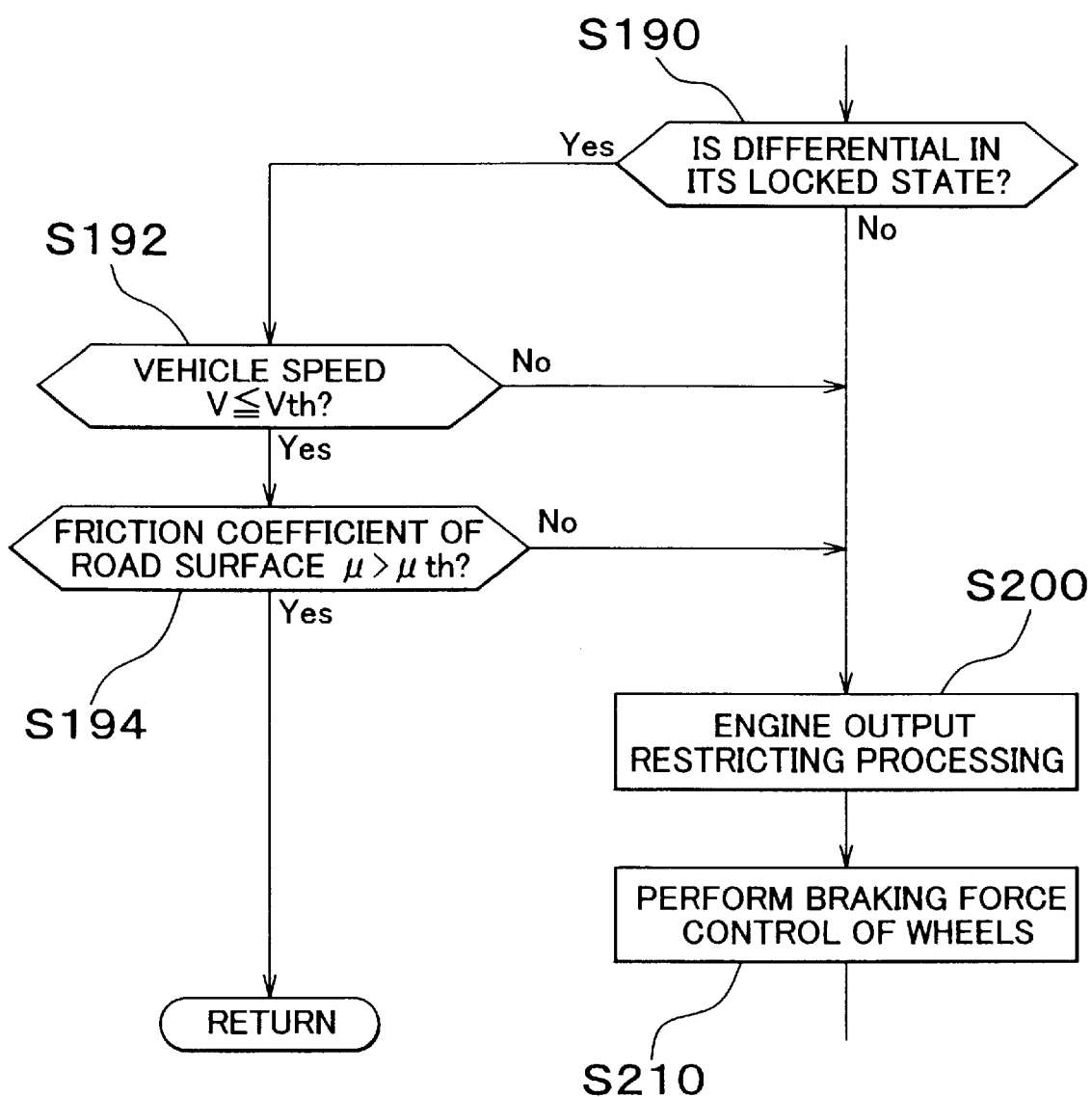
FIG. 11 is an illustrative view showing a part of a flowchart as another example of processing performed after it has been determined that the vehicle is in its differential lock state.

Another control processing that is performed in the case where the center differential 3 is in its locked state will now be described with reference to FIG. 11. According to the example of the flowchart shown in FIG. 8, even in the case where the conditions for starting braking force control (S210) for each of the wheels and so on have been fulfilled, if it has been determined that the center differential 3 is in its locked state ("Yes" in S190), braking force control (S210) and so on are prohibited from being started and the routine is terminated immediately. In the second embodiment, if the result in S190 is "Yes", operation further proceeds to S192 where it is determined whether or not the vehicle speed V is in a low vehicle speed range, i.e., equal to or lower than a predetermined threshold Vth. If the vehicle speed V is higher than the threshold Vth ("No" in S192), operation proceeds to the above-described processings in S200 and the following steps. Namely, the engine output restricting processing (S200) and braking force control for the wheels (S210) are performed. This is because of the intention to stabilize the vehicle behavior by performing the engine output restricting processing (S200) and braking force control for the wheels (S210) by priority while the vehicle is running at a high speed, in consideration of the fact that the turning stability of the vehicle diminishes in proportion to an increase in vehicle speed V.

Furthermore, if the vehicle speed V is in the low vehicle speed range, i.e., equal to or lower than the threshold Vth ("Yes" in S192), operation proceeds to S194 where it is determined whether or not a friction coefficient $\mu$ indicating a state of friction on a road surface is greater than a predetermined reference value $\mu$th. If the center differential 3 assumes its locked state, braking forces for the turning-wise outside front wheels are applied to the rear wheels, or driving forces are applied to the turning-wise inside front wheels. If the road surface is subjected to considerable friction, grounding loads applied to the turning-wise inside wheels may particularly decrease to a considerable extent due to a shift of load caused by a centrifugal force. This may lead to an increase in slip amount.

Thus, if the result in S194 is "Yes", i.e., if the friction coefficient $\mu$ is greater than the reference value $\mu$th, the present routine is terminated immediately. That is, braking force control for the wheels (S210) and so on are prohibited from being started so as to prevent an increase in slip amount. If the result in S194 is "No", i.e., if the road surface has a low friction coefficient $\mu$ that is lower than the reference value $\mu$th, operation proceeds to the processings in S200 and the following steps. That is, the engine output restricting processing (S200) and braking force control for the wheels (S210) are started, in an attempt to stabilize the vehicle behavior.

Methods of estimating the friction coefficient $\mu$ of the road surface are not to be limited specifically. For example, it is possible to adopt a method of searching through an experimentally obtained map based on the steering angle θ and the lateral acceleration Gy and thus estimating the friction coefficient $\mu$ of the road surface, a method of estimating the friction coefficient $\mu$ based on slip ratios of the wheels during acceleration or braking operation, a method of estimating the friction coefficient $\mu$ based on a difference between the lateral acceleration estimated based on the steering angle θ and the vehicle speed V and the lateral acceleration Gy detected by the lateral acceleration sensor 58, or the like.

Next, a third embodiment of the invention will be described.

In the embodiment that has been described with reference to FIG. 8 and so on, even if the center differential 3 has assumed its locked state while braking force control is being performed to control the vehicle behavior, braking force control is continued. In this case, in consideration of the circumstance where the center differential 3 has been locked, it is also possible to correct and use braking forces for the wheels that are set in the case where the center differential 3 is free.

Figure 13:
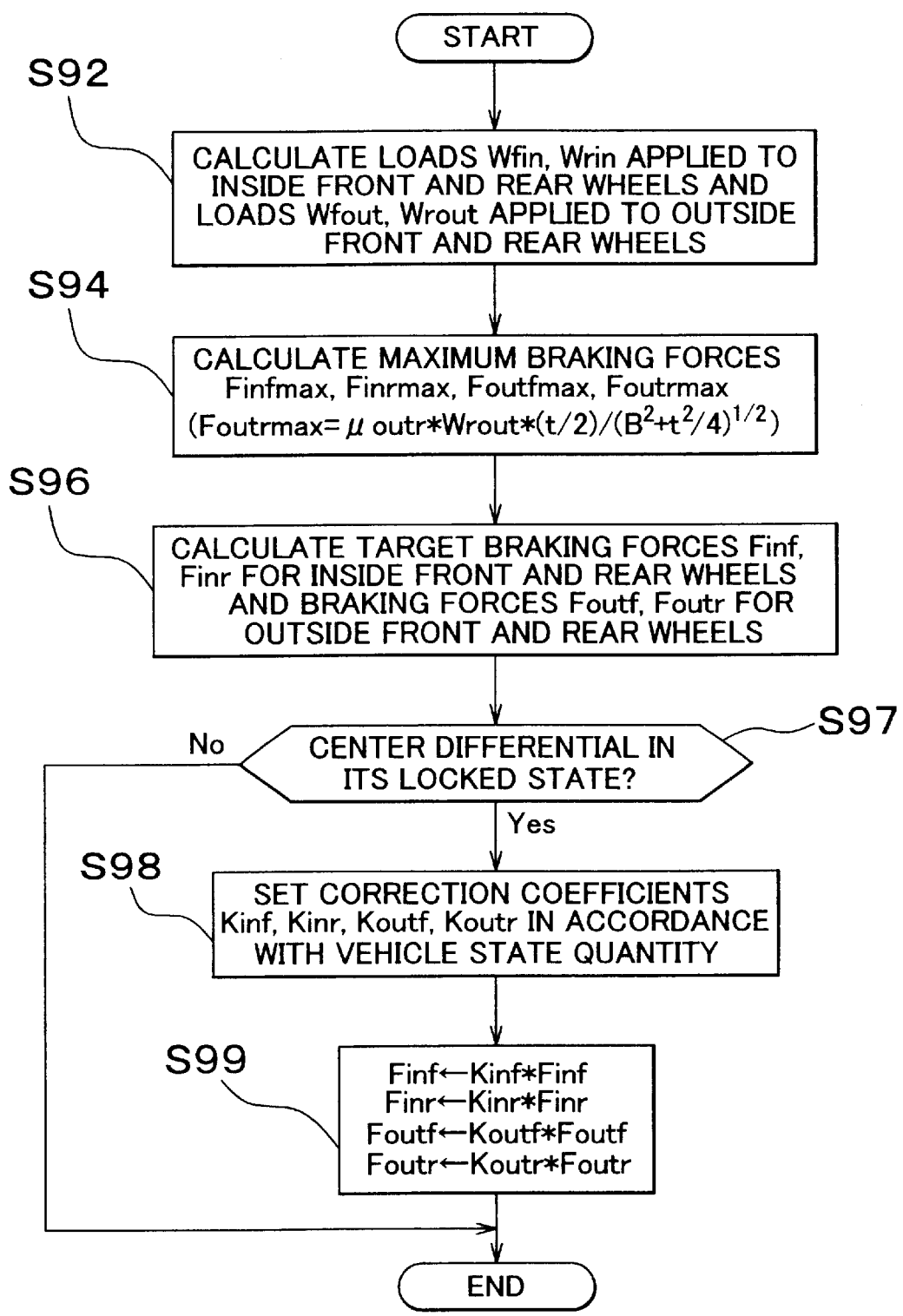
FIG. 13 is a flowchart showing a processing performed in step S90 according to another embodiment of the invention, in which braking forces are distributed to the front and rear wheels.

Such processings of correcting braking forces will be described with reference to an example in which the processings are performed in the above-described S90. As shown in FIG. 13, after the processings in S92 to S96 have been performed as described with reference to FIG. 9, operation proceeds to S97. In S97, it is determined based on a detection result of the differential lock detecting sensor 65 whether or not the center differential 3 is in its locked state. If the center differential 3 is free as a result ("No" in S97), the target braking forces Finf, Finr for the turning-wise inside front and rear wheels and braking forces Foutf, Foutr for the turning-wise outside front and rear wheels as calculated in S96 are set as they are, as is the case with the flowchart shown in FIG. 9.

If the center differential 3 is in its locked state ("Yes" in S97), operation proceeds to S98 where correction coefficients kinf, kinr, koutf, koutr for the wheels are set in accordance with a vehicle state quantity as a spin state quantity that is obtained in S30 and so on. The correction coefficients kinf, kinr, koutf, koutr are braking force correction coefficients that have been set for the turning-wise inside front wheel, the turning-wise inside rear wheel, the turning-wise outside front wheel, and the turning-wise outside rear wheel respectively. For example, correction coefficients for the wheels corresponding to the spin state quantity (a*β+b*βd) are experimentally calculated and mapped in advance. The map is searched through based on the spin state quantity obtained in S30, whereby the correction coefficients kinf, kinr, koutf, koutr corresponding to the respective wheels are set.

In S99, the target braking forces Finf, Finr, Foutf, Foutr calculated in S96 are multiplied by the correction coefficients kinf, kinr, koutf, koutr corresponding to the respective wheels set in S98, respectively. The calculation results are newly set as the target braking forces Finf, Finr, Foutf, Foutr respectively.

By performing such correction processings, braking force control suited for a spin state can be performed to curb a spin tendency and stabilize the turning behavior, even if the center differential 3 is in its locked state.

Figure 14:
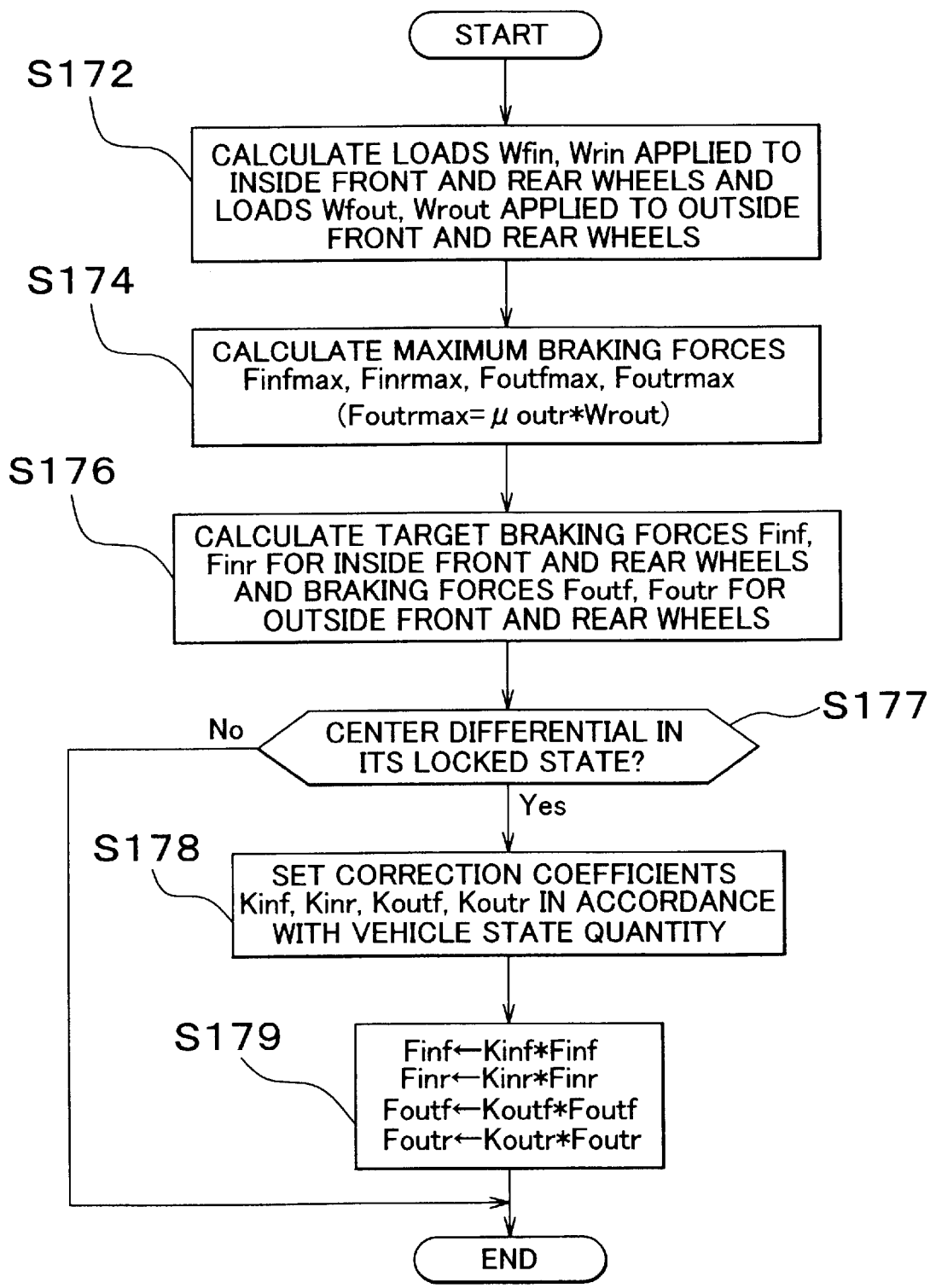
FIG. 14 is a flowchart showing a processing performed in step S70 according to another embodiment of the invention, in which braking forces are distributed to the front and rear wheels.

FIG. 14 is a flowchart showing a case where such processings of correcting braking forces in response to the locking of the center differential 3 are performed in the above-described S170.

Also in this case, after the processings in S172 to S176 have been performed as described with reference to FIG. 10, operation proceeds to S177 and the following steps. The processings in S177 to S179 are also performed in the same manner as the processings in S97 to S99 that have been described with reference to FIG. 13. In S178, however, correction coefficients for the wheels corresponding to a drift-out state quantity (γt−γ) are experimentally calculated and mapped in advance. The map is searched through based on the drift-out state quantity (γt−γ) obtained in S110, whereby the correction coefficients kinf, kinr, koutf, koutr corresponding to the wheels are set.

By performing such correction processings, braking force control suited for a drift-out state can be performed to curb a drift-out tendency and stabilize the turning behavior, even if the center differential 3 is in its locked state.

Next, a fourth embodiment of the invention will be described.

In the flowchart shown in FIG. 8, if it has been required to perform changeover between the 2WD and 4WD modes or to lock the center differential 3, the required operation is always performed regardless of whether or not braking force control is being performed. In the fourth embodiment, however, if it has been required to perform changeover between the 2WD and 4WD modes or to lock the center differential 3 while braking force control is being performed, the requirement is withheld (postponed) until braking force control is terminated.

Such an operation of changeover between 2WD and 4WD will be described with reference to a flowchart shown in FIG. 15.

First of all, in S302, it is determined, based on an operation state of the 2WD/4WD changeover switch 74, whether or not it has been required to change over from 2WD or 4WD or vice versa. The result in S302 is "Yes" if any changeover requirement has been made. Then, operation proceeds to S304 where it is determined whether or not the performance flag F (see FIG. 8) for braking force control has been set as F=0 at this moment, i.e., whether or not braking force control is not being performed. If braking force control is not being performed at this moment, the result in S304 is "Yes". Then, operation proceeds to S306 where a 2WD-4WD changeover operation corresponding to operation of the 2WD/4WD changeover switch 74 is started.

Further, if the result in S304 is "No", i.e., if it has been required to perform changeover between the 2WD and 4WD modes during performance of braking force control, operation proceeds to S308 where a corresponding indicator lamp is blinked or an acoustic warning is issued to indicate that the required operation has been suspended. Operation further proceeds to S310 where it is determined whether or not the performance flag F for braking force control has been set as F=0, i.e., whether or not braking force control has been terminated. If the result in S310 is "No", operation returns to the above-mentioned S308. This processing is repeated until the result in S310 becomes "Yes". If braking force control has been terminated afterwards, the result in S310 is "Yes", and operation proceeds to S312. After canceling the indication of suspension of the required operation, issued in S308, operation proceeds to S306 where the required operation of changeover between the 2WD and 4WD modes is started.

Figure 16:
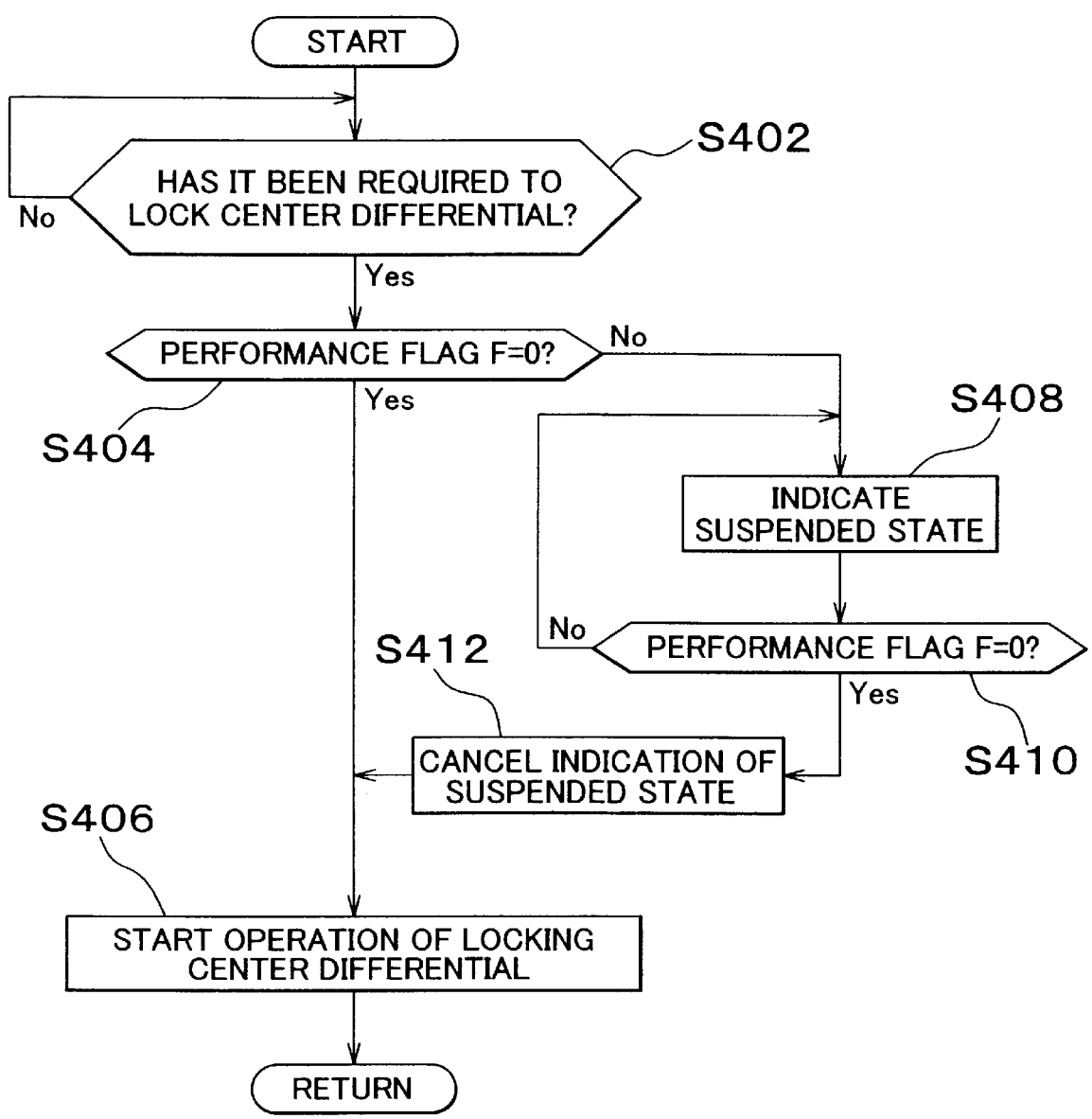
FIG. 16 is a flowchart showing an example of processings performed if a request has been made to lock a center differential during braking force control.

Further, differential lock control of the center differential 3 can also be performed in the same manner and will be described with reference to the flowchart shown in FIG. 16.

First of all, in S402, it is determined, based on an operation state of the differential lock switch 73, whether or not it has been required to lock the center differential 3. If it has been required to lock the center differential 3, the result in S402 is "Yes". Then, operation proceeds to S404 where it is determined whether or not the performance flag F (see FIG. 8) for braking force control has been set as F=0 at this moment, i.e., whether or not braking force control is not being performed. If braking control is not being performed at this moment, the result in S404 is "Yes". Then, operation proceeds to S406 where an operation of locking the center differential 3 is started.

Further, if the result in S404 is "No", i.e., if it has been required to lock the center differential 3 during braking force control, operation proceeds to S408 where a corresponding indicator lamp is blinked or an acoustic warning is issued to indicate that the required operation has been suspended. Operation further proceeds to S410 where it is determined whether or not the performance flag F for braking force control has been set as F=0, i.e., whether or not braking force control has been terminated. If the result in S410 is "No", operation returns to the above-mentioned S408. This processing is repeated until the result in S410 becomes "Yes". If braking force control has been terminated afterwards, the result in S410 is "Yes", and operation proceeds to S412. After canceling the indication of suspension of the required operation, issued in S402, operation proceeds to S406 where the required operation of locking the center differential 3 is started.

Figure 15:
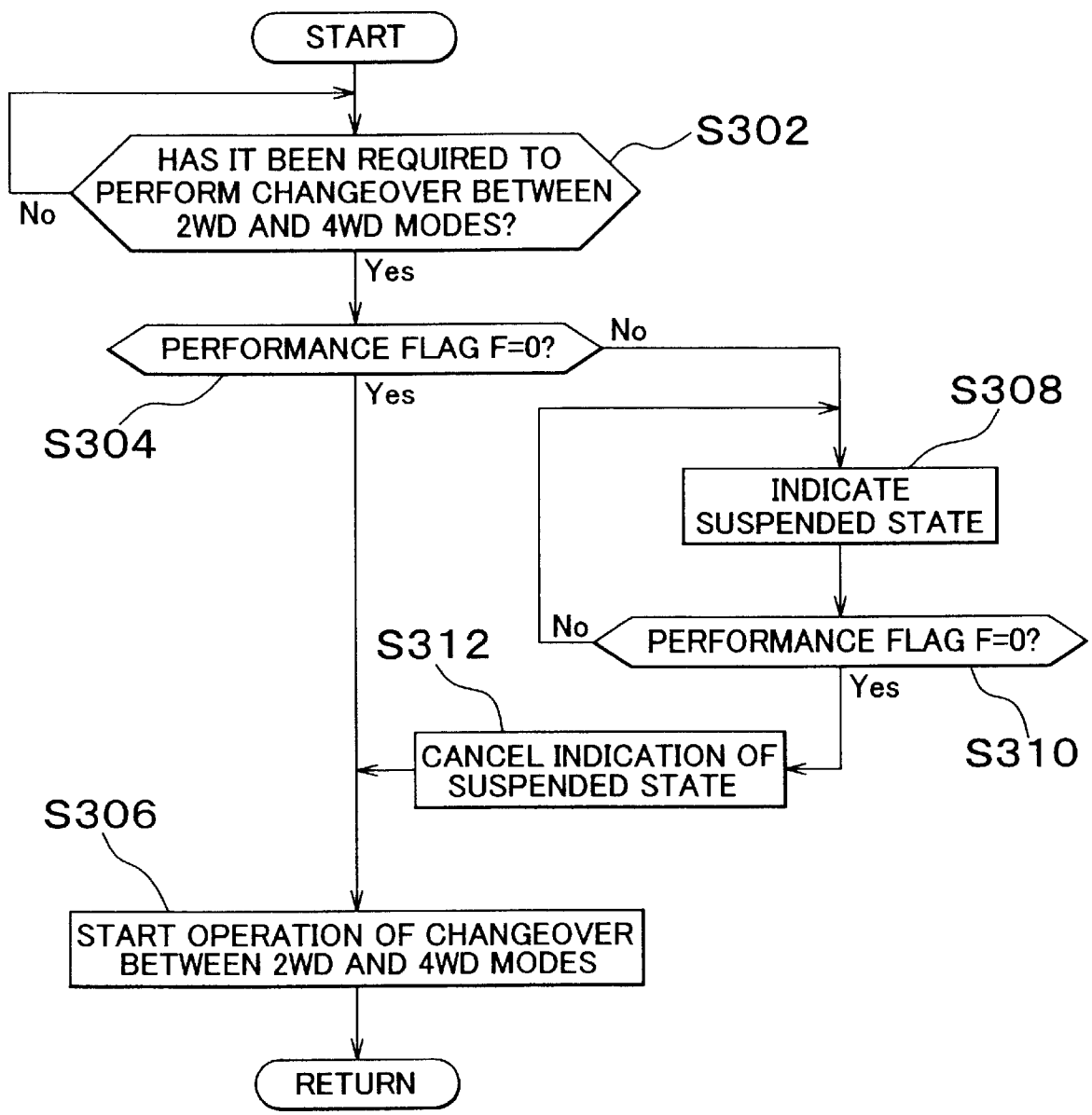
FIG. 15 is a flowchart showing an example of processings that are performed if a request has been made to switch one of 2WD and 4WD modes to the other during braking force control.

By performing the processings as shown in FIGS. 15 and/or 16, the center differential 3 is prevented from being locked during braking force control. Thus, braking force control can be performed normally. After the turning behavior of the vehicle has been stabilized and braking force control has been terminated, an operation of changeover between the 2WD and 4WD modes or an operation of locking the center differential 3 can be performed smoothly.

Figure 17:
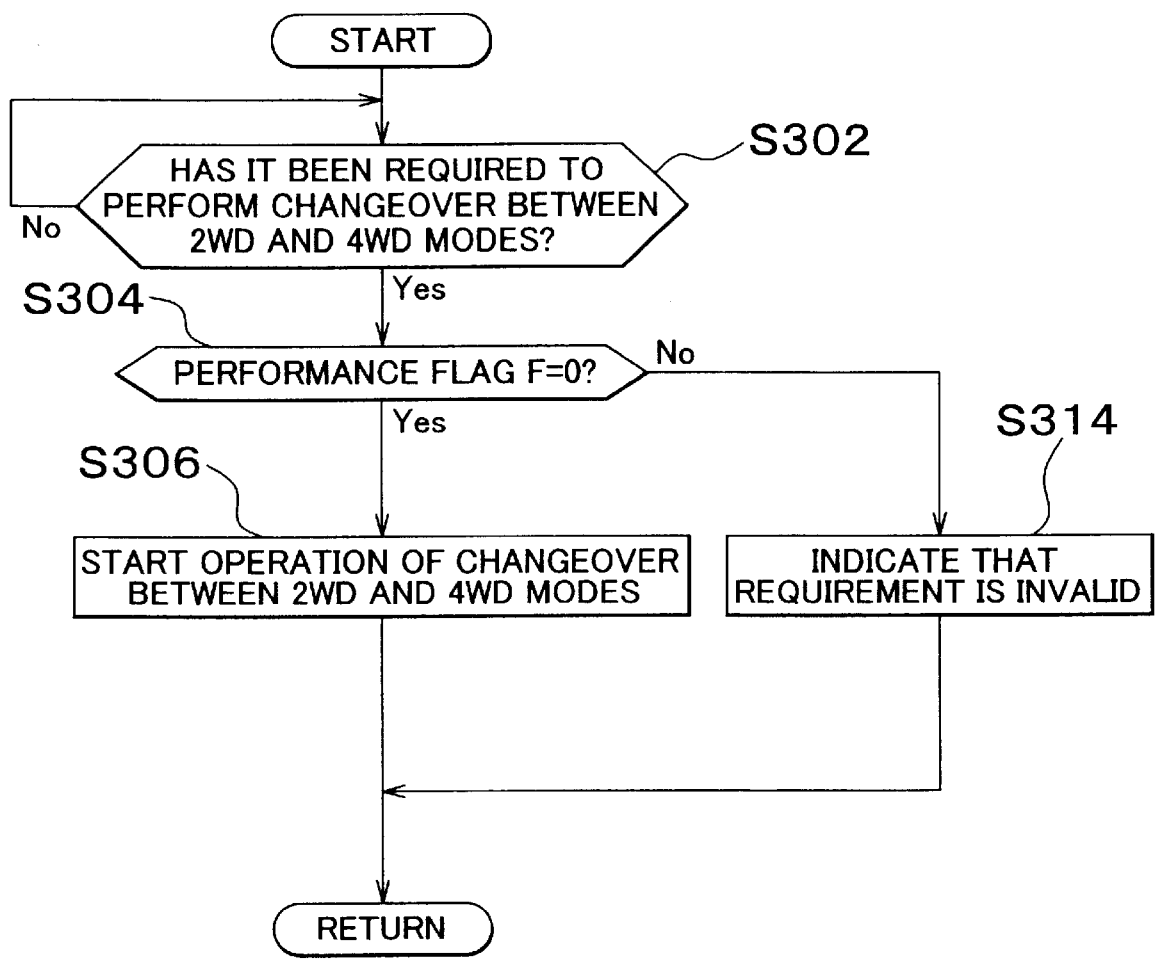
FIG. 17 is a flowchart showing another example of processings performed if a request has been made to switch one of the 2WD and 4WD modes to the other during braking force control.
Figure 18:
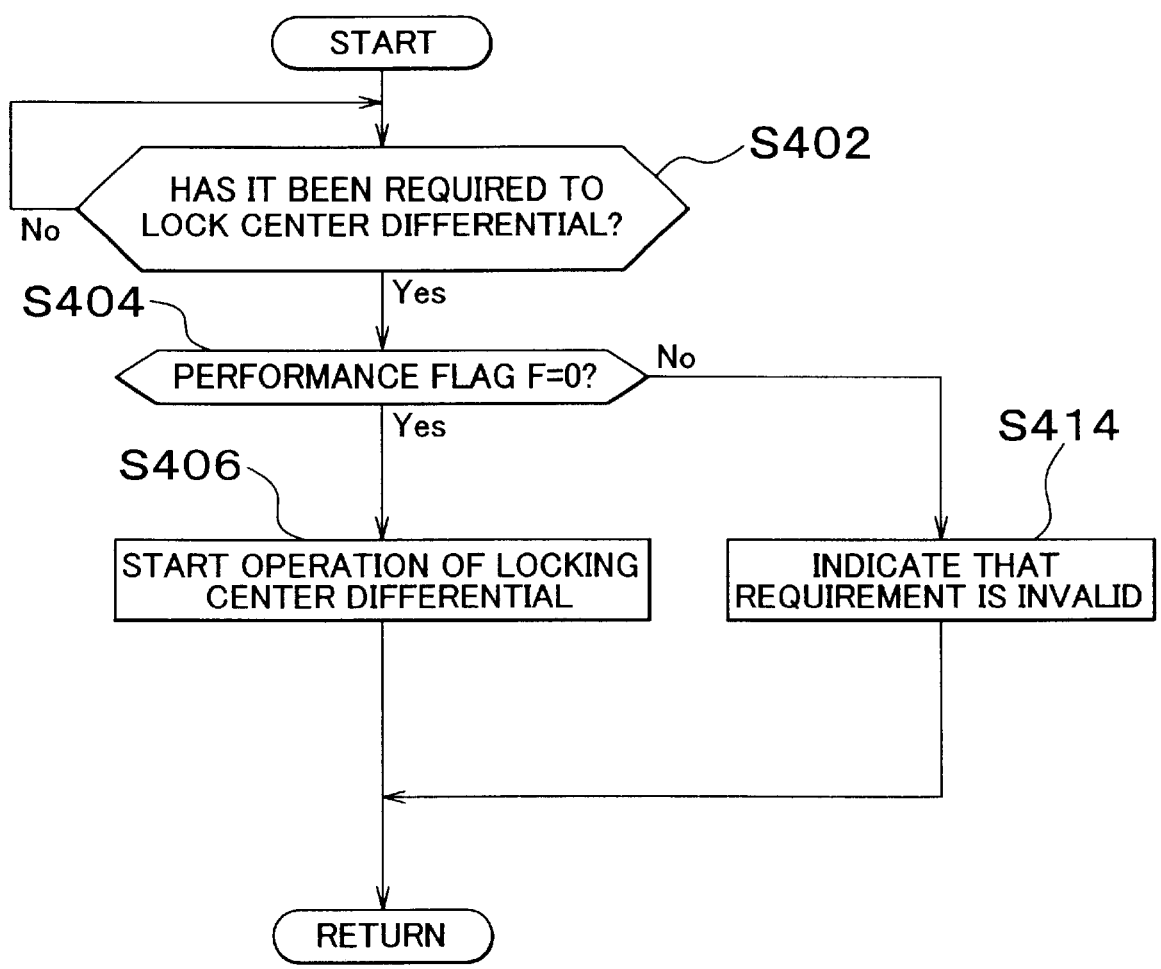
FIG. 18 is a flowchart showing another example of processings performed if a request has been made to lock the center differential during braking force control.

FIGS. 17 and 18 show flowcharts of invalidating a requirement that has been made to perform changeover between the 2WD and 4WD modes or lock the center differential 3 during braking force control. Referring to FIGS. 17 and 18, if braking force control is being performed (if the results in S304, S404 are "No"), operation respectively proceeds to S314, S414 where a lamp is blinked or an acoustic warning is issued for a predetermined period to indicate that the requirement is invalid. Then, the present routine is terminated immediately. As for the other processings, the flowcharts shown in FIGS. 17 and 18 are identical with those shown in FIGS. 15 and 16 respectively. In FIGS. 17 and 18, processings identical with those shown in FIGS. 15 and 16 are denoted by the same step numbers, and description thereof will be omitted.

Figure 19:
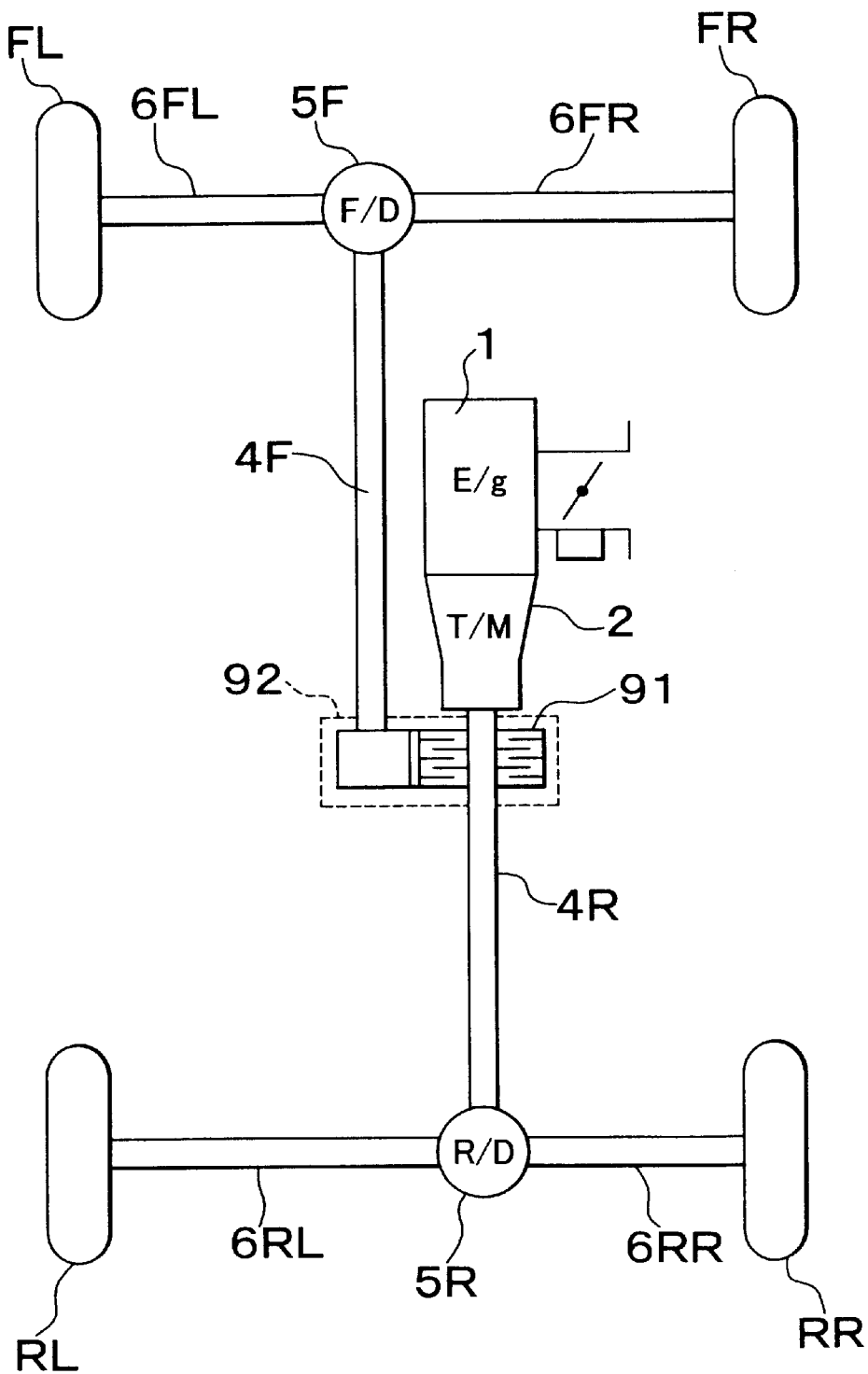
FIG. 19 is a block diagram schematically showing another four-wheel-drive mechanism.
Figure 20:
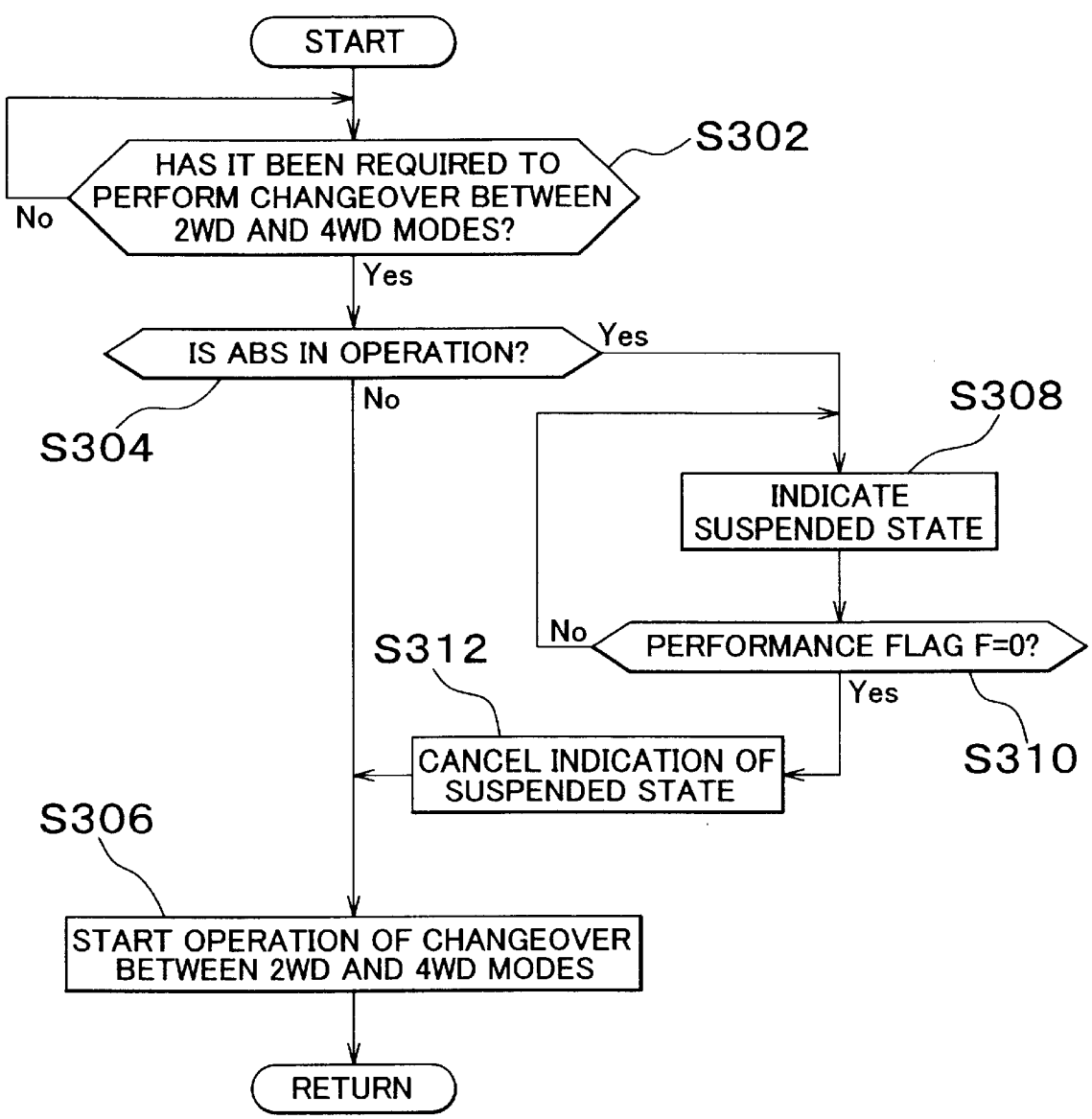
FIG. 20 is a flowchart showing an example of processings performed if a request has been made to switch one of the 2WD and 4WD modes to the other during operation of an ABS.
Figure 21:
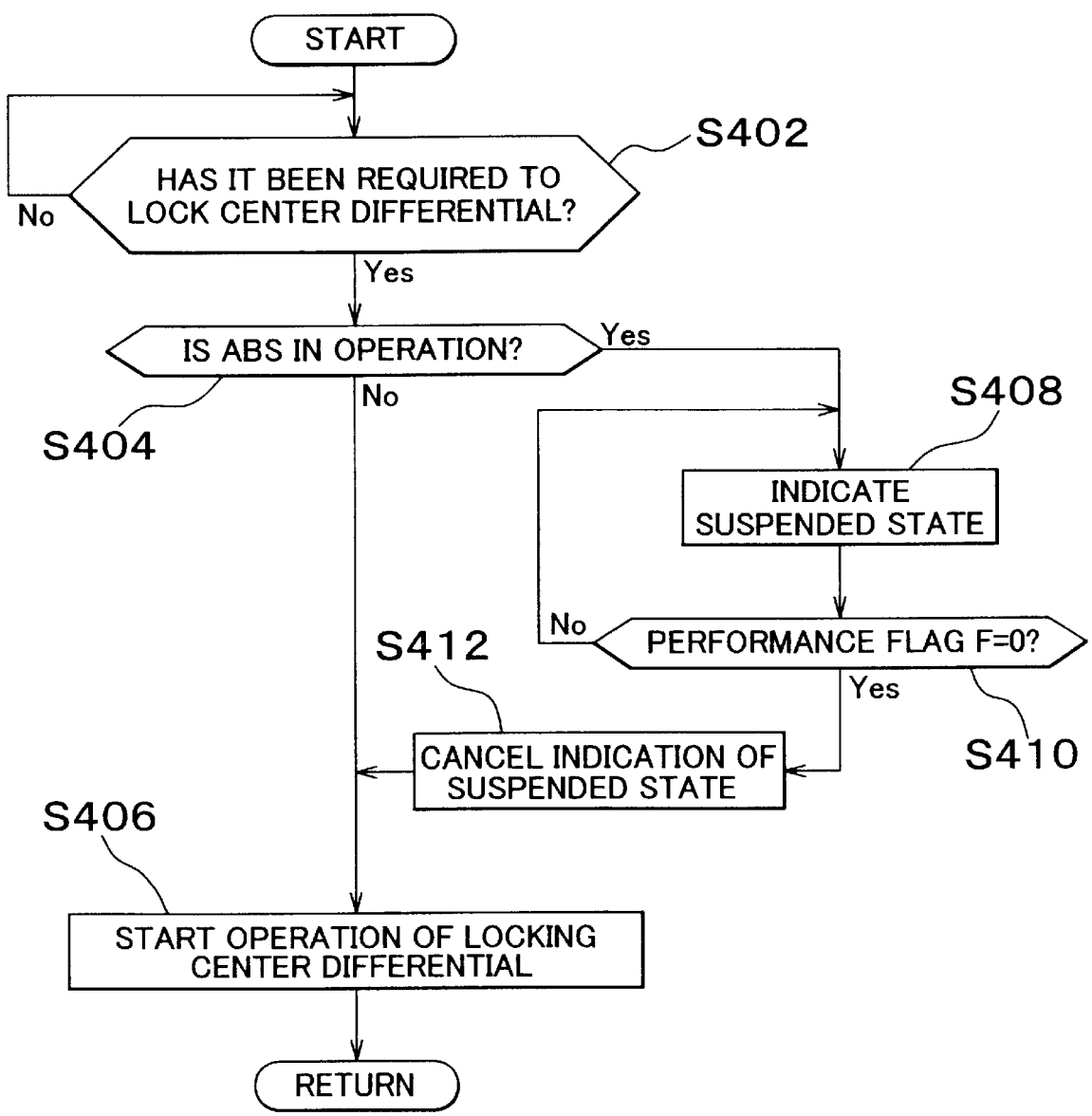
FIG. 21 is a flowchart showing an example of processings performed if a request has been made to lock the center differential during operation of the ABS.
Figure 22:
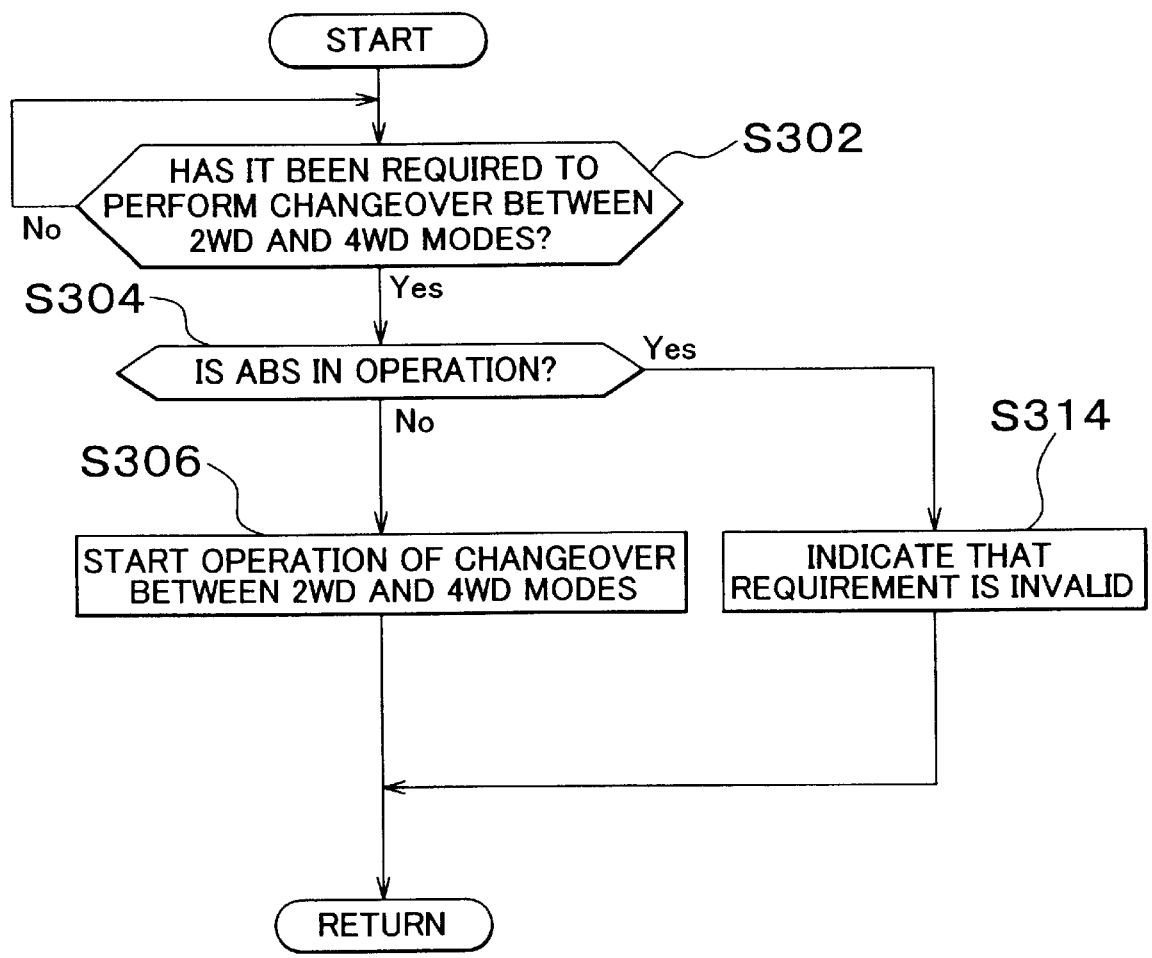
FIG. 22 is a flowchart showing another example of processings performed if a request has been made to switch one of the 2WD and 4WD modes to the other during operation of the ABS.
Figure 23:
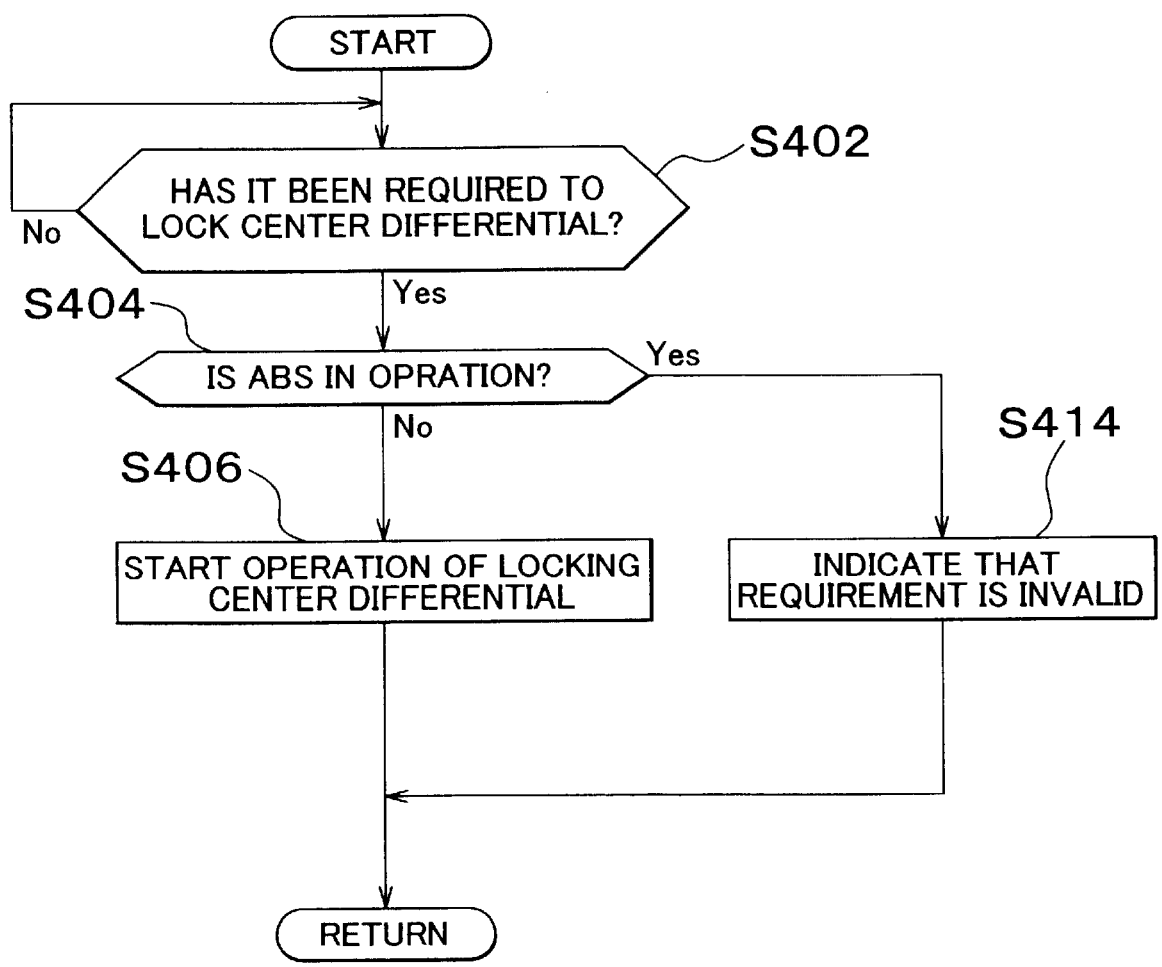
FIG. 23 is a flowchart showing another example of processings performed if a request has been made to lock the center differential during operation of the ABS.

Each of the embodiments described above handles, as an example, a vehicle that can change over between two-wheel-drive and four-wheel-drive modes. However, the invention can also be applied to a four-wheel-drive mechanism as shown in FIG. 19. In the four-wheel-drive mechanism shown in FIG. 19, the output portion of the transmission 2 is directly connected to the rear-wheel-side drive shaft 4R, and the front-wheel-side drive shaft 4F is provided with a mechanism in which a driving torque is divided by a transfer 92 into which a multiple disc clutch 91 is incorporated. If the press-fitting force applied to the multiple disc clutch 91 is small enough, the two rear wheels are driven. The driving torque distributed to the front-wheel-side drive shaft 4F increases in proportion to an increase in the press-fitting force applied to the multiple disc clutch 91. Upon complete engagement of the multiple disc clutch 91, the four-wheel-drive (rigid 4WD) mode in which the drive shafts 4F, 4R are directly connected is established. Such control of the press-fitting force applied to the multiple disc clutch 91 is performed, e.g., using a hydraulic pressure. For example, the hydraulic pressure is controlled using differences in rotational speed between the front wheels FL, FR and the rear wheels RL, RR and the lateral acceleration applied to the vehicle as main factors. That is, hydraulic pressure control is thus performed, whereby a front-to-rear driving force distribution control system capable of continuous changeover between the rear-wheel-drive mode and the 4WD mode is constituted. The ratio of the driving force applied to the front wheels to the driving force applied to the rear wheels is 0:100 if the multiple disc clutch 91 has been released. This ratio gradually approaches 50:50 in proportion to an increase in the press-fitting force applied to the multiple disc clutch 91.

In the case where such a front-to-rear driving force distribution control system is applied to the flowchart shown in FIG. 8, it is determined in S190 whether or not the connecting strength between the drive shafts 4F, 4R is greater than a predetermined value, based on a hydraulic pressure applied to the multiple disc clutch 91. As an embodiment corresponding to FIG. 15 and so on, the hydraulic pressure to be applied to the multiple disc clutch 91 is maintained constant during performance of braking force control, and the connecting state of the multiple disc clutch 91 is prohibited from being changed while braking force control is being performed. For example, instead of prohibiting the connecting state of the multiple disc clutch 91 from being changed, a processing of limiting a range of changes in the connecting state of the multiple disc clutch 91 to a predetermined narrow range, and so on may be performed while braking force control is being performed.

In the above-described embodiment shown in FIGS. 15 to 18, if it has been required to perform changeover between the 2WD and 4WD modes or lock the center differential 3 during braking force control, the requirement is regarded as invalid or ignored until braking force control is terminated. However, the invention is not limited to such a case. As an example of other cases, even when an anti-lock brake system (ABS) that prevents wheels from being locked at the time of braking is in operation, the same procedure as shown in FIGS. 15 to 18 can be followed. FIGS. 20 to 23 are flowcharts in which the processings in FIGS. 15 to 18 have been modified for an anti-lock brake system. In this case, it is determined in S304 and S404 whether or not the anti-lock brake system is in operation. If the anti-lock brake system is out of operation, the required operation is started immediately. If the anti-lock brake system is in operation, the required operation is suspended or invalidated. The processings shown in FIGS. 20 to 23 are identical with those shown in FIGS. 15 to 18 respectively. In FIGS. 20 to 23, processings identical with those shown in FIGS. 15 to 18 are denoted by the same step numbers, and description thereof will be omitted.

As has been described above, according to the vehicular brake control apparatus of one aspect of the invention, while the connecting strength between both the drive shafts is great, even if the conditions for starting brake control by means of a brake controller have been fulfilled, brake control is prohibited. Thus, changes in driveability, which may take place if brake control has been started in the circumstance where the connecting strength between both the drive shafts is great, can be prevented. Furthermore, even if the connecting strength between both the drive shafts has become great while brake control is being performed by the brake controller, brake control is continued by the brake controller. Therefore, brake control can be prevented from being stopped accidentally. Also, the spin/drift-out curbing effect to be exerted by brake control can be achieved sufficiently.

Further, according to the vehicular brake control apparatus of another aspect of the invention, changes in the connecting state between the front and rear drive shafts are restricted from being changed during performance of brake control. Thus, the influence caused by changes in the connecting state between the front and rear drive shafts is minimized. Therefore, appropriate brake control can be performed continuously until the recovery of a running state of the vehicle.

In the illustrated embodiment, the controller (the control unit 50) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A vehicular brake control apparatus comprising:
    a connecting state coupling interposed between a front-wheel drive shaft that transmits a driving force to a front-wheel side and a rear-wheel drive shaft that transmits a driving force to a rear-wheel side, and that changes a connecting state between the front-wheel drive shaft and the rear-wheel drive shaft;
    brakes, each of which is provided in a corresponding one of wheels to apply a braking force to the corresponding one of the wheels; and
    a brake controller that performs operation control of the brakes in accordance with a running state of the vehicle and that controls braking forces to be applied to the wheels individually, wherein the brake controller:
        (a) prohibits brake control if conditions for starting brake control by the brake controller have been fulfilled during a period in which the coupling causes a great connecting strength to act between the front-wheel drive shaft and the rear-wheel drive shaft, and
        (b) continues brake control if the connecting state between the front-wheel drive shaft and the rear-wheel drive shaft has been changed during perfoarmance of the brake control such that the great connecting strength acts between the front-wheel drive shaft and the rear-wheel drive shaft while brake control is being performed by the brake controller.

2. The brake control apparatus according to claim 1, wherein the brake controller prohibits brake control from being started if conditions for starting brake control by the brake controller have been fulfilled when the coupling is in a locked state in which relative rotation between the front-wheel drive shaft and the rear-wheel drive shaft is locked.

3. The brake control apparatus according to claim 1, wherein the brake controller continues brake control if the connecting strength between the front-wheel drive shaft and the rear-wheel drive shaft has temporarily become the great connecting strength while brake control is being performed by the brake controller.

4. The brake control apparatus according to claim 3, wherein the brake controller continues brake control if the connecting strength between the front-wheel drive shaft and the rear-wheel drive shaft has become the great connecting strength as a result of a changeover operation of the coupling between two-wheel-drive and four-wheel-drive modes while brake control is being performed by the brake controller.

5. The brake control apparatus according to claim 1, wherein the brake controller performs brake control without prohibiting the brake control if the vehicle is running at a speed higher than a threshold while the connecting strength between the front-wheel drive shaft and the rear-wheel drive shaft is the great connecting strength.

6. The brake control apparatus according to claim 1, wherein the brake controller performs brake control without prohibiting the brake control if a road surface has a friction coefficient smaller than a reference value while the connecting strength between the front-wheel drive shaft and the rear-wheel drive shaft is the great connecting strength.

7. The brake control apparatus according to claim 1, wherein the brake controller individually controls braking forces to be applied to the wheels such that a turning behavior of the vehicle is stabilized, if turning behavior of the vehicle is in a predetermined state.

8. The brake control apparatus according to claim 1, wherein the connecting state coupling includes a lockable differential.

9. The brake control apparatus according to claim 1, wherein the connecting state coupling includes a variable clutch mechanism.

10. A brake control method for a vehicle having (a) a connecting state coupling interposed between a front-wheel drive shaft that transmits a driving force to a front-wheel side and a rear-wheel drive shaft that transmits the driving force to a rear-wheel side, and that changes a connecting state between the front-wheel drive shaft and the rear-wheel drive shaft, (b) brakes, each of which is provided in a corresponding one of wheels to apply a braking force to the corresponding one of the wheels, and (c) a controller that performs operation control of the brakes in accordance with a running state of the vehicle and that controls braking forces to be applied to the wheels individually, comprising the steps of:

prohibiting brake control if conditions for starting brake control by the brake controller have been fulfilled during a period in which the coupling causes a great connecting strength to act between the front-wheel drive shaft and the rear-wheel drive shaft; and continuing brake control by the brake controller if the connecting state between the front-wheel drive shaft and the rear-wheel drive shaft has been changed during performance of the brake control such that the great connecting strength acts between the front-wheel drive shaft and the rear-wheel drive shaft, while brake control is being performed by the brake controller.

11. The brake control method according to claim 10, wherein performance of the brake control is continued if the connecting strength between the front-wheel drive shaft and the rear-wheel drive shaft has temporarily become the great connecting strength while brake control is being performed by the brake controller.

12. The brake control method according to claim 11, wherein performance of the brake control is continued if the connecting strength between the front-wheel drive shaft and the rear-wheel drive shaft has become the great connecting strength as a result of a changeover operation of the coupling between two-wheel-drive and four-wheel-drive modes while brake control is being performed by the brake controller.

13. The brake control method according to claim 10, wherein the brake control is prohibited from being started if conditions for starting brake control by the brake controller have been fulfilled when the coupling is in a locked state in which relative rotation between the front-wheel drive shaft and the rear-wheel drive shaft is locked.

14. The brake control method according to claim 10, wherein the brake control is not prohibited if the vehicle is running at a speed higher than a threshold while the connecting strength between the front-wheel drive shaft and the rear-wheel drive shaft is the great connecting strength.

15. The brake control method according to claim 10, wherein the brake control is not prohibited if a road surface has a friction coefficient smaller than a reference value while the connecting strength between the front-wheel drive shaft and the rear-wheel drive shaft is the great connecting strength.

16. The brake control method according to claim 10, wherein the controller individually controls braking forces to be applied to the wheels such that a turning behavior of the vehicle is stabilized, if turning behavior of the vehicle is in a predetermined state.

* * * * *